(12) United States Patent
Takagi et al.

(10) Patent No.: US 11,365,569 B2
(45) Date of Patent: Jun. 21, 2022

(54) VEHICLE DOOR LOCK APPARATUS

(71) Applicant: ANSEI CORPORATION, Obu (JP)

(72) Inventors: Masaharu Takagi, Nagoya (JP); Satoshi Yamaji, Nagoya (JP)

(73) Assignee: ANSEI CORPORATION, Obu (JP)

( * ) Notice: Subject to any disclaimer, the term of this patent is extended or adjusted under 35 U.S.C. 154(b) by 1027 days.

(21) Appl. No.: 15/819,126

(22) Filed: Nov. 21, 2017

(65) Prior Publication Data

US 2018/0148956 A1 May 31, 2018

(30) Foreign Application Priority Data

Nov. 25, 2016 (JP) .............................. JP2016-228571

(51) Int. Cl.
*E05B 79/20* (2014.01)
*E05B 77/28* (2014.01)
(Continued)

(52) U.S. Cl.
CPC .............. *E05B 79/20* (2013.01); *B60J 5/0493* (2013.01); *E05B 77/283* (2013.01); *E05B 79/12* (2013.01);
(Continued)

(58) Field of Classification Search
CPC ........ E05B 79/20; E05B 77/283; E05B 79/12; E05B 81/16; E05B 81/34; E05B 81/66;
(Continued)

(56) References Cited

U.S. PATENT DOCUMENTS

| | | | |
|---|---|---|---|
| 2,634,147 | A | 4/1953 | Robertson |
| 2,806,727 | A | 9/1957 | Johnstone |

(Continued)

FOREIGN PATENT DOCUMENTS

| | | |
|---|---|---|
| CN | 1174882 C | 11/2004 |
| CN | 1729341 A | 2/2006 |

(Continued)

OTHER PUBLICATIONS

Machine Translation of WO 2016021084 A1, 2020, pp. 1-21 (Year: 2020).*

(Continued)

*Primary Examiner* — Kristina R Fulton
*Assistant Examiner* — Steven A Tullia
(74) *Attorney, Agent, or Firm* — J-Tek Law PLLC; Jeffrey D. Tekanic; Mark A. Ussai

(57) ABSTRACT

A vehicle door lock apparatus has a first housing superimposed on a second housing that includes a base wall, a first concave wall projecting from the base wall, an engaging part formed in or on the first concave wall, and an opening that provides a path from the outside into an inner housing chamber. A transmission cable includes an inner cable slidably housed in an outer cable. A portion of the inner cable is exposed from a first end of the outer cable, passes through the opening, and is coupled to a rotatable element disposed in the inner housing chamber via a linkage. A casing cap that surrounds an end of the outer cable has a contact part that contacts the first concave wall in a second direction and an engaged part that engages with the engaging part in the second direction when the contact part contacts the first concave wall.

22 Claims, 15 Drawing Sheets

(51) Int. Cl.
- *E05B 81/72* (2014.01)
- *E05B 81/34* (2014.01)
- *E05B 81/16* (2014.01)
- *E05B 79/12* (2014.01)
- *E05B 81/66* (2014.01)
- *B60J 5/04* (2006.01)
- *E05B 85/02* (2014.01)

(52) U.S. Cl.
CPC .............. *E05B 81/16* (2013.01); *E05B 81/34* (2013.01); *E05B 81/66* (2013.01); *E05B 81/72* (2013.01); *E05B 85/02* (2013.01)

(58) Field of Classification Search
CPC .......... E05B 81/72; E05B 85/02; E05B 79/22; B60J 5/0493; Y10T 292/1082; Y10T 292/1047; Y10T 74/2045; Y10T 74/20462; Y10S 292/23; Y10S 292/53
See application file for complete search history.

(56) References Cited

U.S. PATENT DOCUMENTS

| | | | |
|---|---|---|---|
| 2,934,930 A | 5/1960 | Garvey | |
| 2,977,785 A | 4/1961 | Beckman | |
| 2,996,327 A | 8/1961 | France et al. | |
| 3,334,934 A | 8/1967 | Bela | |
| 3,359,767 A | 12/1967 | Alfonsas et al. | |
| 3,400,962 A | 9/1968 | Martens | |
| 3,596,482 A | 8/1971 | Pollak | |
| 3,848,909 A | 11/1974 | Foley | |
| 4,382,622 A | 5/1983 | Ishikawa | |
| 4,440,006 A | 4/1984 | Kleefeldt | |
| 4,783,102 A | 11/1988 | Bernard | |
| 4,948,184 A | 8/1990 | Weyerstall et al. | |
| 5,350,206 A * | 9/1994 | Akahori | E05B 63/0056 292/336.3 |
| 5,603,539 A | 2/1997 | Gruhn et al. | |
| 5,733,046 A | 3/1998 | Bellmore et al. | |
| 5,802,894 A | 9/1998 | Jahrsetz et al. | |
| 6,178,845 B1 * | 1/2001 | Gutschner | F16C 1/105 74/501.5 R |
| 6,264,253 B1 | 7/2001 | Takaishi | |
| 6,416,088 B1 | 7/2002 | Graute | |
| 6,419,286 B1 | 7/2002 | Szablewski | |
| 6,601,885 B1 | 8/2003 | Yiu | |
| 6,971,816 B2 * | 12/2005 | Miyagawa | F16C 1/105 248/74.1 |
| 7,478,846 B2 | 1/2009 | Yoshikuwa et al. | |
| 7,568,741 B2 | 8/2009 | Odahara | |
| 7,621,571 B2 | 11/2009 | Umino | |
| 7,762,594 B2 | 7/2010 | Arabia, Jr. et al. | |
| 7,815,231 B2 * | 10/2010 | Suzumura | E05B 85/02 292/216 |
| 7,827,836 B2 | 11/2010 | Cetnar | |
| 8,240,723 B2 | 8/2012 | Akahori et al. | |
| 8,376,417 B2 | 2/2013 | Machida et al. | |
| 8,438,888 B2 | 5/2013 | Akizuki et al. | |
| 8,678,452 B2 | 3/2014 | Nagaoka et al. | |
| 8,726,705 B2 | 5/2014 | Tabe et al. | |
| 8,789,861 B2 | 7/2014 | Takayanagi et al. | |
| 8,814,228 B2 | 8/2014 | Fujiwara et al. | |
| 8,827,328 B2 | 9/2014 | Akizuki et al. | |
| 9,027,435 B2 * | 5/2015 | Ohba | F16C 1/105 74/502.6 |
| 9,631,404 B2 | 4/2017 | Takagi et al. | |
| 9,708,837 B2 | 7/2017 | Bendel et al. | |
| 10,047,548 B2 | 8/2018 | Zeabari | |
| 10,094,149 B2 | 10/2018 | Mittelbach | |
| 10,151,124 B2 * | 12/2018 | Faitl | F16C 1/145 |
| 10,196,838 B2 * | 2/2019 | Nagaoka | E05B 79/20 |
| 10,267,069 B2 * | 4/2019 | Zhang | E05B 77/38 |
| 10,273,724 B2 | 4/2019 | Yamagata et al. | |
| 10,526,823 B2 * | 1/2020 | Nagata | B60J 5/00 |
| 10,597,908 B2 * | 3/2020 | Taga | E05B 77/44 |
| 2001/0015558 A1 | 8/2001 | Fisher et al. | |
| 2003/0107235 A1 | 6/2003 | Komatsu et al. | |
| 2003/0218340 A1 | 11/2003 | Coleman et al. | |
| 2004/0178659 A1 | 9/2004 | Komatsu et al. | |
| 2004/0227357 A1 | 11/2004 | Ishihara et al. | |
| 2004/0251712 A1 | 12/2004 | Obara | |
| 2005/0140149 A1 | 6/2005 | Umino | |
| 2005/0218661 A1 | 10/2005 | Brose et al. | |
| 2006/0006671 A1 | 1/2006 | Noel et al. | |
| 2006/0028029 A1 | 2/2006 | Spurr | |
| 2006/0048598 A1 * | 3/2006 | Roussel | F16C 1/16 74/502.6 |
| 2006/0087129 A1 | 4/2006 | Gotou et al. | |
| 2006/0157989 A1 | 7/2006 | Graute | |
| 2006/0214467 A1 | 9/2006 | Usuzaki et al. | |
| 2008/0078215 A1 | 4/2008 | Odahara | |
| 2008/0203737 A1 | 8/2008 | Tomaszewski et al. | |
| 2010/0084888 A1 | 4/2010 | Ishitobi et al. | |
| 2010/0109350 A1 | 5/2010 | Gschweng et al. | |
| 2010/0194120 A1 | 8/2010 | Kaiser et al. | |
| 2010/0207401 A1 | 8/2010 | Taga | |
| 2010/0327609 A1 | 12/2010 | Akizuki et al. | |
| 2011/0179835 A1 | 7/2011 | Tabe et al. | |
| 2012/0000258 A1 | 1/2012 | Akizuki et al. | |
| 2012/0056437 A1 | 3/2012 | Takayanagi et al. | |
| 2012/0068479 A1 | 3/2012 | Bendel et al. | |
| 2012/0118029 A1 | 5/2012 | Akizuki et al. | |
| 2013/0015673 A1 | 1/2013 | Akizuki et al. | |
| 2013/0049379 A1 | 2/2013 | Yokota et al. | |
| 2013/0328325 A1 | 12/2013 | Uehara et al. | |
| 2014/0346786 A1 | 11/2014 | Takagi et al. | |
| 2014/0361555 A1 | 12/2014 | Bendel et al. | |
| 2015/0048632 A1 | 2/2015 | Menke | |
| 2015/0191945 A1 | 7/2015 | Yamaguchi et al. | |
| 2015/0247347 A1 * | 9/2015 | Suzumura | E05B 79/22 292/2 |
| 2015/0259952 A1 | 9/2015 | Barmscheidt | |
| 2015/0267441 A1 | 9/2015 | Fuchs et al. | |
| 2015/0361694 A1 | 12/2015 | Zeabari | |
| 2016/0017645 A1 | 1/2016 | Tomaszewski et al. | |
| 2016/0115718 A1 | 4/2016 | Lee et al. | |
| 2016/0177599 A1 | 6/2016 | Nozawa et al. | |
| 2016/0208523 A1 | 7/2016 | Bingle et al. | |
| 2016/0273248 A1 | 9/2016 | Mittelbach | |
| 2016/0281395 A1 | 9/2016 | Scholz et al. | |
| 2016/0312498 A1 | 10/2016 | Jidaisho | |
| 2017/0122355 A1 * | 5/2017 | Estrada | E05B 79/20 |
| 2017/0138096 A1 | 5/2017 | Zhang | |
| 2017/0159334 A1 | 6/2017 | Ishiguro | |
| 2017/0204639 A1 * | 7/2017 | Akahori | E05B 81/70 |
| 2017/0234039 A1 * | 8/2017 | Taga | E05B 79/04 292/337 |
| 2018/0016820 A1 | 1/2018 | Takagi et al. | |
| 2018/0023325 A1 | 1/2018 | Takagi et al. | |
| 2018/0023327 A1 | 1/2018 | Takagi et al. | |
| 2018/0073282 A1 | 3/2018 | Takagi et al. | |
| 2018/0080262 A1 | 3/2018 | Takagi et al. | |

FOREIGN PATENT DOCUMENTS

| | | | |
|---|---|---|---|
| CN | 101748944 A | 6/2010 | |
| CN | 101812947 A | 8/2010 | |
| CN | 101812948 A | 8/2010 | |
| CN | 102362041 A | 2/2012 | |
| CN | 101641231 B | 11/2012 | |
| CN | 102822434 A | 12/2012 | |
| CN | 103195310 A | 7/2013 | |
| CN | 203239056 U | 10/2013 | |
| CN | 103403283 A | 11/2013 | |
| CN | 203294205 U | 11/2013 | |
| CN | 103597155 A | 2/2014 | |
| CN | 104114792 A | 10/2014 | |
| CN | 203961528 U | 11/2014 | |
| CN | 105525808 A | 4/2016 | |
| CN | 105545126 A | 5/2016 | |
| CN | 105593445 A | 5/2016 | |
| CN | 106065748 A | 11/2016 | |
| DE | 102005059833 A1 * | 8/2006 | E05B 79/20 |

(56) References Cited

FOREIGN PATENT DOCUMENTS

| | | | |
|---|---|---|---|
| DE | 102008015627 A1 | 10/2009 | |
| DE | 102015223514 A1 * | 6/2016 | ............. E05B 85/02 |
| EP | 0894923 A1 | 2/1999 | |
| EP | 2881529 A1 | 6/2015 | |
| EP | 2754799 B1 | 3/2017 | |
| GB | 2396656 A | 6/2004 | |
| GB | 2477612 A | 8/2011 | |
| JP | S5944477 A | 3/1984 | |
| JP | S61163866 U | 10/1986 | |
| JP | H0617960 | 5/1994 | |
| JP | 2528945 Y2 * | 3/1997 | |
| JP | 2002129806 A | 5/2002 | |
| JP | 4163490 A | 6/2004 | |
| JP | 2004156330 A | 6/2004 | |
| JP | 2005188130 A | 7/2005 | |
| JP | 2008088708 A | 4/2008 | |
| JP | 2011026826 A | 2/2011 | |
| JP | 2011153431 A | 8/2011 | |
| JP | 2011226194 A | 11/2011 | |
| JP | 5030908 B2 | 9/2012 | |
| JP | 2012180702 A * | 9/2012 | |
| JP | 2012180702 A | 9/2012 | |
| JP | 2013036242 A | 2/2013 | |
| JP | 2013036242 A * | 2/2013 | |
| JP | 2013096144 A | 5/2013 | |
| JP | 2013117115 A | 6/2013 | |
| JP | 2014015717 A | 1/2014 | |
| JP | 2014029094 A | 2/2014 | |
| JP | 2014043769 A | 3/2014 | |
| JP | 5509377 B1 * | 6/2014 | ............. E05B 79/20 |
| JP | 2015034423 A * | 2/2015 | ............. E05B 85/02 |
| JP | 2015096683 A | 5/2015 | |
| JP | 2015209641 A | 11/2015 | |
| JP | 2016037700 A | 3/2016 | |
| JP | 2016056550 A | 4/2016 | |
| JP | 2016098589 A | 5/2016 | |
| JP | 5930273 B2 | 6/2016 | |
| JP | 6172026 B2 * | 8/2017 | |
| JP | 2018012940 A | 1/2018 | |
| JP | 2018031256 A | 3/2018 | |
| JP | 2018141361 A * | 9/2018 | |
| KR | 100694448 B1 | 3/2007 | |
| TW | 593005 B | 6/2004 | |
| WO | WO-2016021084 A1 * | 2/2016 | ............. E05B 81/16 |

OTHER PUBLICATIONS

Machine Translation of DE 102005059833, 2021, pp. 1-5 (Year: 2021).*

Unpublished U.S. Appl. No. 16/296,717.

Machine translation of Search Report from the Japanese Patent Office dated Feb. 18, 2020 in related Japanese application No. 2016-223076.

Office Action from the Japanese Patent Office dated Feb. 25, 2020 in related Japanese application No. 2016-223076, and machine translation thereof.

Office Action and Search Report from the Taiwanese Patent Office dated Jul. 30, 2020 in related application No. 106131946, and translation thereof.

Office Action from the Japanese Patent Office dated Nov. 5, 2019 in related Japanese application No. 2016-140590, and machine translation thereof.

Office Action from the Japanese Patent Office dated Nov. 5, 2019 in related Japanese application No. 2016-183897, and machine translation thereof.

Office Action and Search Report from the Chinese Patent Office dated Jul. 3, 2020 in related Chinese application No. 201711162019, and machine translation thereof.

Unpublished U.S. Appl. No. 15/456,770.
Unpublished U.S. Appl. No. 15/653,645.
Unpublished U.S. Appl. No. 15/653,700.
Unpublished U.S. Appl. No. 15/698,888.
Unpublished U.S. Appl. No. 15/813,700.

Office Action and Search Report from the Taiwanese Patent Office dated Dec. 7, 2020 in related application No. TW 106139944, and machine translation thereof.

* cited by examiner

VEHICLE DOOR LOCK APPARATUS

CROSS-REFERENCE

This application claims the priority benefit of Japanese Patent Application Nos. 2016-228571 filed on Nov. 25, 2016, the entire contents of which are incorporated by reference as if fully set forth herein.

TECHNICAL FIELD

The present invention relates to a vehicle door lock apparatus.

BACKGROUND ART

Japanese Patent Laid-Open No. 2012-180702 (hereinafter "JP 2012-180702") discloses a known vehicle door lock apparatus that is fixed between a vehicle frame and a door that is openable and closable with respect to the vehicle frame and is capable of holding the door closed with respect to the vehicle frame. The vehicle door lock apparatus includes a housing, a latch mechanism, an actuating mechanism, and transmission cables.

The housing includes a housing chamber. The latch mechanism is housed in the housing. The latch mechanism is capable of holding the door closed with respect to the vehicle frame. The actuating mechanism is housed in the housing chamber. The actuating mechanism includes rotatable elements. The rotatable elements rotate around respective rotational axes that each extend in a first direction, which is at least substantially parallel to a vehicle inward-outward direction; the rotatable elements are configured to actuate the latch mechanism. The transmission cables are introduced into the housing chamber from the outside and are configured to rotate the respective rotatable elements.

More specifically, the rotatable elements are a locking lever and an inside lever, respectively. Two transmission cables are introduced into the housing chamber from the outside. One transmission cable is configured to rotate the locking lever. The other transmission cable is configured to rotate the inside lever.

The housing includes a first housing, a second housing, and an auxiliary cover. The second housing is superimposed on the first housing in the first direction and the housing chamber is formed in the interior thereof. A base wall, a wall projecting perpendicularly therefrom in the first direction, and an opening are formed in (on) the second housing. The base wall extends in a second direction that is at least substantially orthogonal to the first direction and also extends in a third direction that is substantially orthogonal to the first direction and the second direction. A concave part, which has a recess in the first direction toward the base wall, is formed on the wall that projects perpendicularly from the base wall. The opening passes through the base wall such that a path from the outside into the housing chamber is provided. The auxiliary cover is superimposed on the base wall of the second housing in the first direction so as to cover the base wall, the wall projecting perpendicularly therefrom and the opening.

Each transmission cable includes an outer cable and an inner cable. A casing cap is provided at a first end of each outer cable. The inner cable is housed within the outer cable and is capable of sliding back and forth relative to the outer cable. The inner cable is exposed at the first end of the outer cable; the exposed portion of the inner cable passes through the opening and is linked (coupled) to the rotatable element via a linkage.

In this known vehicle door lock apparatus, after fitting the distal end portion of the casing cap on (in) the concave part, the casing cap is sandwiched between the base wall and the wall perpendicular thereto of the second housing and the auxiliary cover in the first direction. In this way, the first end of each of the outer cables is fixed to the second housing.

However, in this known vehicle door lock apparatus, because the auxiliary cover is required in order to fix the first end of the outer cable to the second housing, the part count is high. In addition, because the auxiliary cover is superimposed on the base wall of the second housing in the first direction that is substantially parallel to the vehicle inward-outward direction, a reduction in thickness of the vehicle door lock apparatus in the vehicle inward-outward direction is hindered owing to the thickness of the auxiliary cover.

SUMMARY

In view of these circumstances, an object of the present teachings is to provide a vehicle door lock apparatus that can achieve a part count reduction as well as a reduction in thickness in the vehicle inward-outward direction.

A vehicle door lock apparatus according to one aspect of the present teachings is fixed between a vehicle frame and a door that is openable and closable with respect to the vehicle frame and is capable of holding the door closed with respect to the vehicle frame. The vehicle door lock apparatus preferably includes:

a housing having an inner housing chamber formed therein;

a latch mechanism housed in the housing and configured to hold the door closed with respect to the vehicle frame;

an actuating mechanism housed in the inner housing chamber and including a rotatable element that rotates around a rotational axis extending in a first direction that is at least substantially parallel to a vehicle inward-outward direction, the rotatable element being configured to actuate the latch mechanism; and a transmission cable extending through a wall of the housing into the inner housing chamber and configured to rotate the rotatable element;

wherein:

the housing includes a first housing superimposed on a second housing in the first direction to form the inner housing chamber, the second housing has:
  a base wall extending in a second direction that is at least substantially orthogonal to the first direction and extends in a third direction that is at least substantially orthogonal to the first direction and the second direction,
  a first wall that projects from the base wall in the first direction and also extends along the third direction,
  an engaging part formed in or on the first wall and extending in the second direction, and
  an opening that passes through the base wall and provides a path from the exterior into the inner housing chamber, the transmission cable includes an inner cable slidably disposed within an outer cable, a portion of the inner cable is an exposed portion exposed at a first end portion of the outer cable, the exposed portion extends through the opening and is coupled to the rotatable element via a linkage, a casing cap is disposed around the first end portion of the outer cable, and the casing cap has a contact part that contacts the first wall in the second direction and an engaged part that engages with the engaging part in the second direction when the contact part is in contact with the first wall.

Other aspects and advantages of the present invention will be apparent from the embodiments disclosed in the following description and the attached drawings, the illustrations exemplified in the drawings, and the general concept or gist of the invention disclosed in the entire description and drawings.

DETAILED DESCRIPTION OF PREFERRED EMBODIMENTS

Embodiments 1 and 2 of the present teachings will be explained below with reference to the drawings.

Embodiment 1

Figure 1:
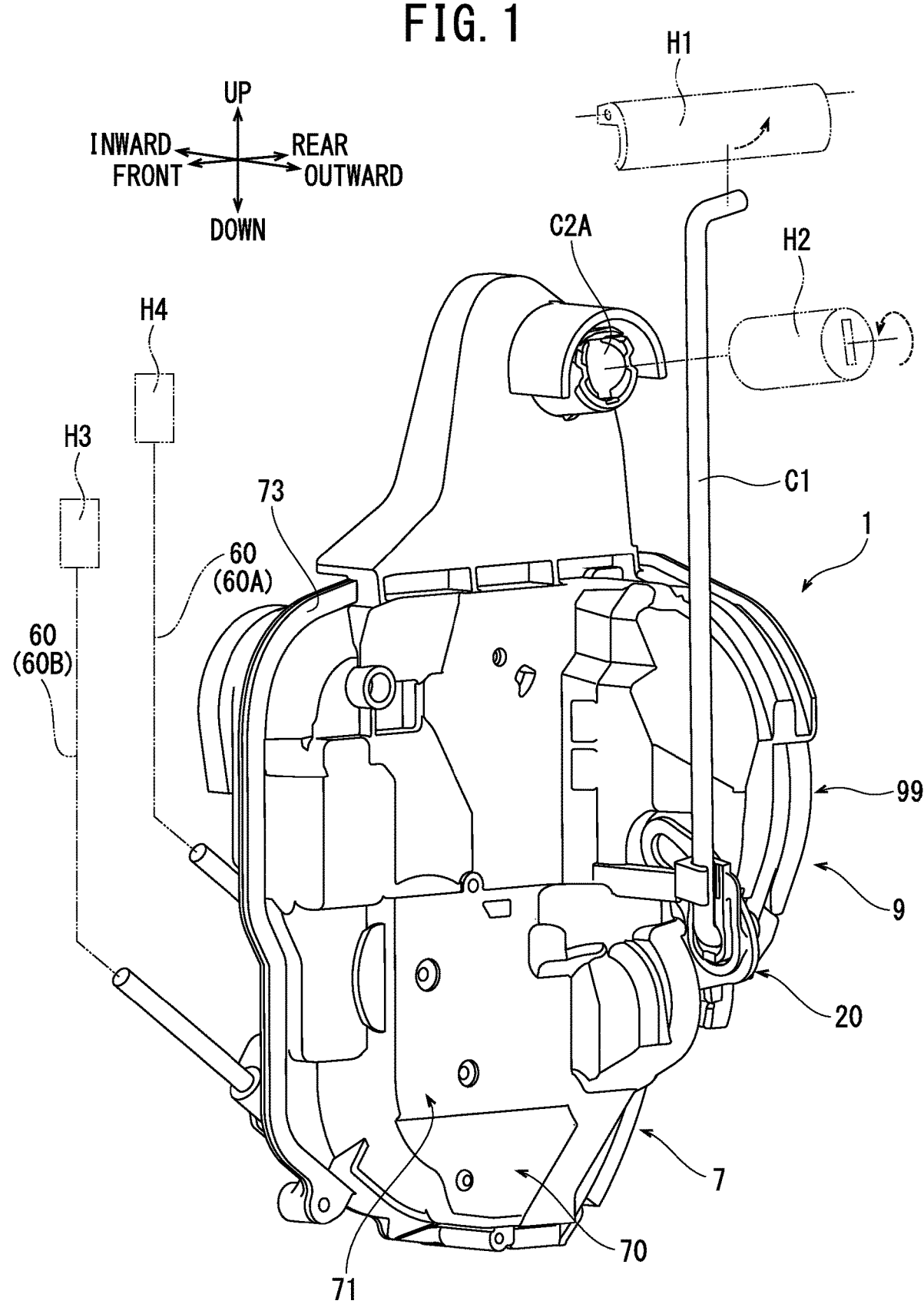
FIG. 1 is a perspective view of a vehicle door lock apparatus according to Embodiment 1 of the present teachings.
Figure 2:
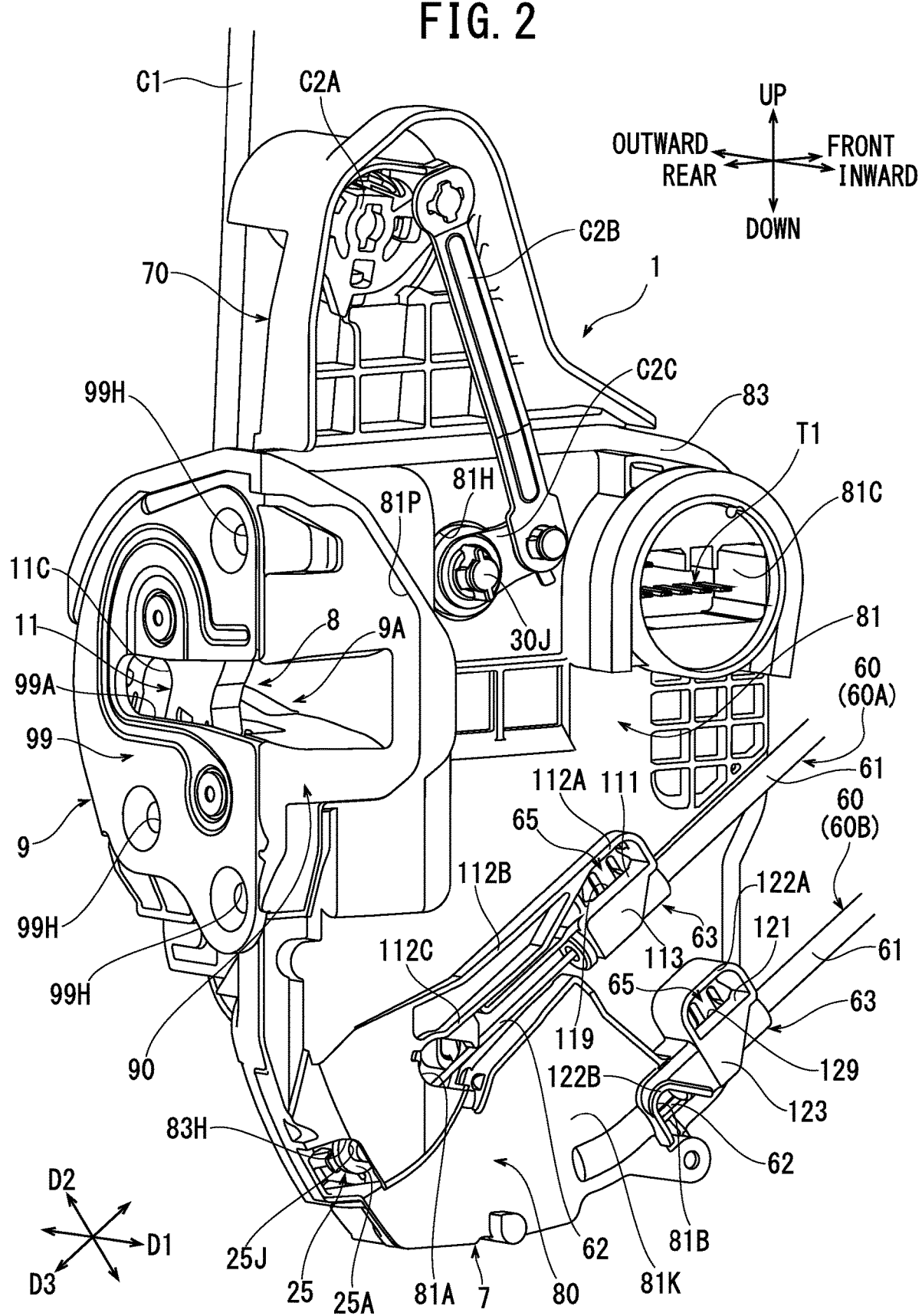
FIG. 2 is a perspective view of the vehicle door lock apparatus of Embodiment 1.
Figure 20:
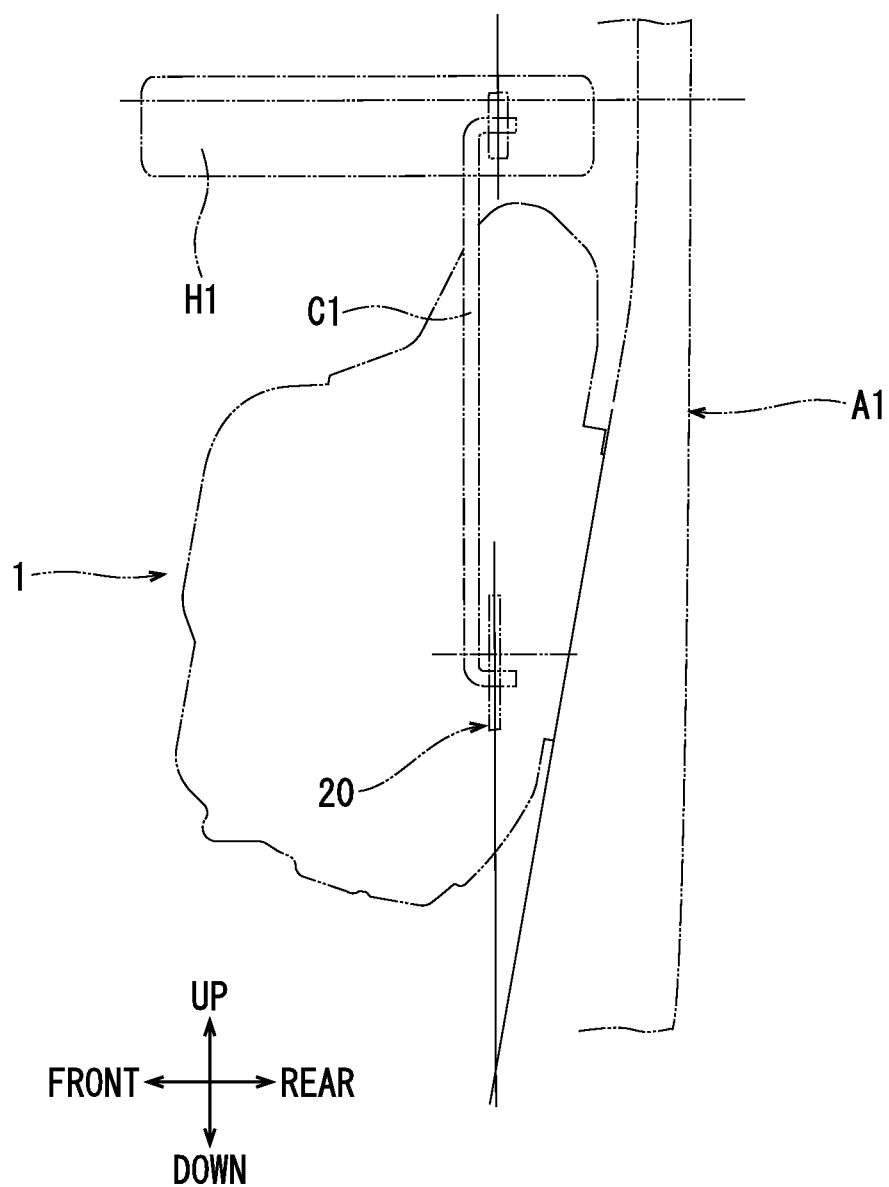
FIG. 20 is a schematic view for explaining the positional relationship of a door handle relative to a transmission rod in an embodiment in which a vehicle door lock apparatus of the present teachings is mounted on, for example, a front door.
Figure 21:
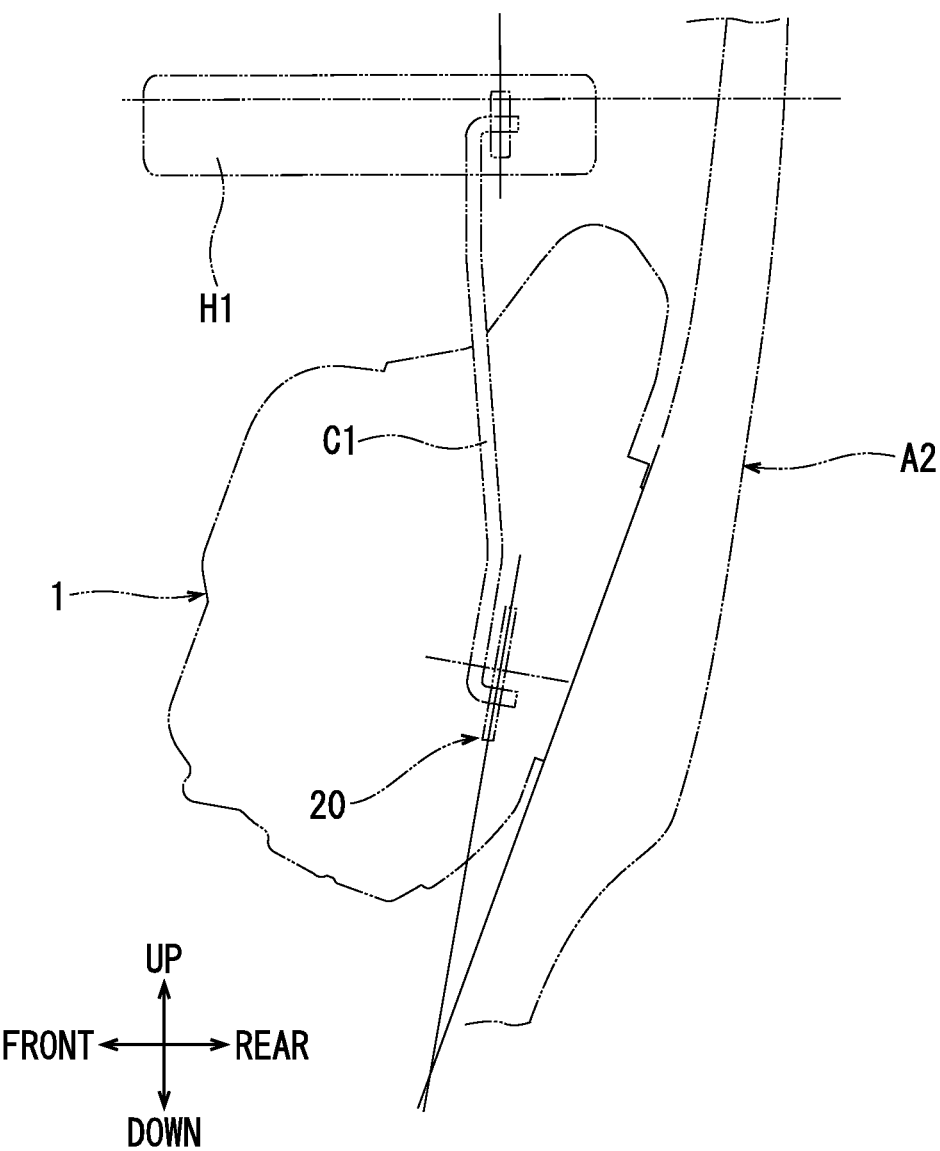
FIG. 21 is a schematic view for explaining the positional relationship of the door handle relative to the transmission rod in an embodiment in which a vehicle door lock apparatus of the present teachings is mounted on, for example, a rear door.

FIGS. 1 and 2 show a vehicle door lock apparatus 1 (hereinafter sometimes simply referred to as "door lock apparatus 1") according to Embodiment 1, which is a representative, non-limiting embodiment of the present teachings. As shown in FIGS. 20 and 21, the door lock apparatus 1 is configured to be affixed (attached) to a front door A1 or to a rear door A2 that is openable and closable relative to a vehicle frame (chassis) of a vehicle, such as an automobile, a bus, a commercial vehicle, a truck, etc. By retaining (latching or holding) a striker (S1—see FIGS. 11-14) that is affixed to the vehicle frame, the door lock apparatus 1 is capable of retaining (holding) the door A1, A2 closed with respect to the vehicle frame.

In FIGS. 1 and 2, the door lock apparatus 1 is configured to be disposed on the inside at the rear end of the door provided on the left-side surface of the vehicle frame. It is noted that, when another door lock apparatus 1 is affixed on the inside at the rear end of the door provided on the right-side surface of the vehicle frame, the two door lock apparatuses 1 will be disposed in a mirror image state. In addition or in the alternative, the door lock apparatus 1 according to the present teachings can be provided in (on) a back door, or another portion of the vehicle.

The front-rear direction and the up-down direction shown in FIGS. 1 and 2 are based on the front-rear (longitudinal) direction and the up-down (vertical or height) direction of the vehicle. The vehicle inward-outward (lateral) direction shown in FIGS. 1 and 2 is based on a person sitting in the cabin of the vehicle. The left surface side of the vehicle is set as the vehicle exterior and the opposite side is set as the vehicle interior. The front-rear direction, the up-down direction, and the vehicle inward-outward direction shown in FIG. 3 and the reference directions shown in the subsequent Figures correspond to the reference directions shown in FIGS. 1 and 2.

As shown in FIG. 1, an exterior door handle H1 and a key cylinder H2 are disposed on the outer surface of a door (not shown in FIGS. 1 and 2), to which the door lock apparatus 1 is affixed (attached). An interior door lock knob H3 and an interior door handle H4 are disposed on the inner (interior) surface of the door that is exposed to (faces) the cabin of the vehicle.

As shown in FIGS. 1, 20 and 21, the upper end of a transmission rod C1 is operably coupled to the exterior door handle H1. The door lock apparatus 1 is disposed downward of the exterior door handle H1 on the inside of the front door A1 or the rear door A2. The lower end of the transmission rod C1 is operably coupled to an outside open lever 20 of the door lock apparatus 1.

The key cylinder H2 is retained so as to be rotatable integrally with a key-cylinder retainer C2A, which is rotatably (turnably) provided at (in) the upper end portion of the door lock apparatus 1. As shown in FIG. 2, the upper end of a link rod C2B is operably coupled to the key-cylinder retainer C2A. The lower end of the link rod C2B is connected via a link lever C2C to an outside lock lever 30, which will be explained below with reference to FIG. 4, etc.

As shown in FIG. 1, one end of a first transmission cable 60 (60A) is connected to the interior door handle H4 and the other end is connected to the door lock apparatus 1, as will further be discussed below. Similarly, one end of a second transmission cable 60 (60B) is connected to the interior door lock knob H3 and the other end is connected to the door lock apparatus 1, as will also further be discussed below.

Figure 4:
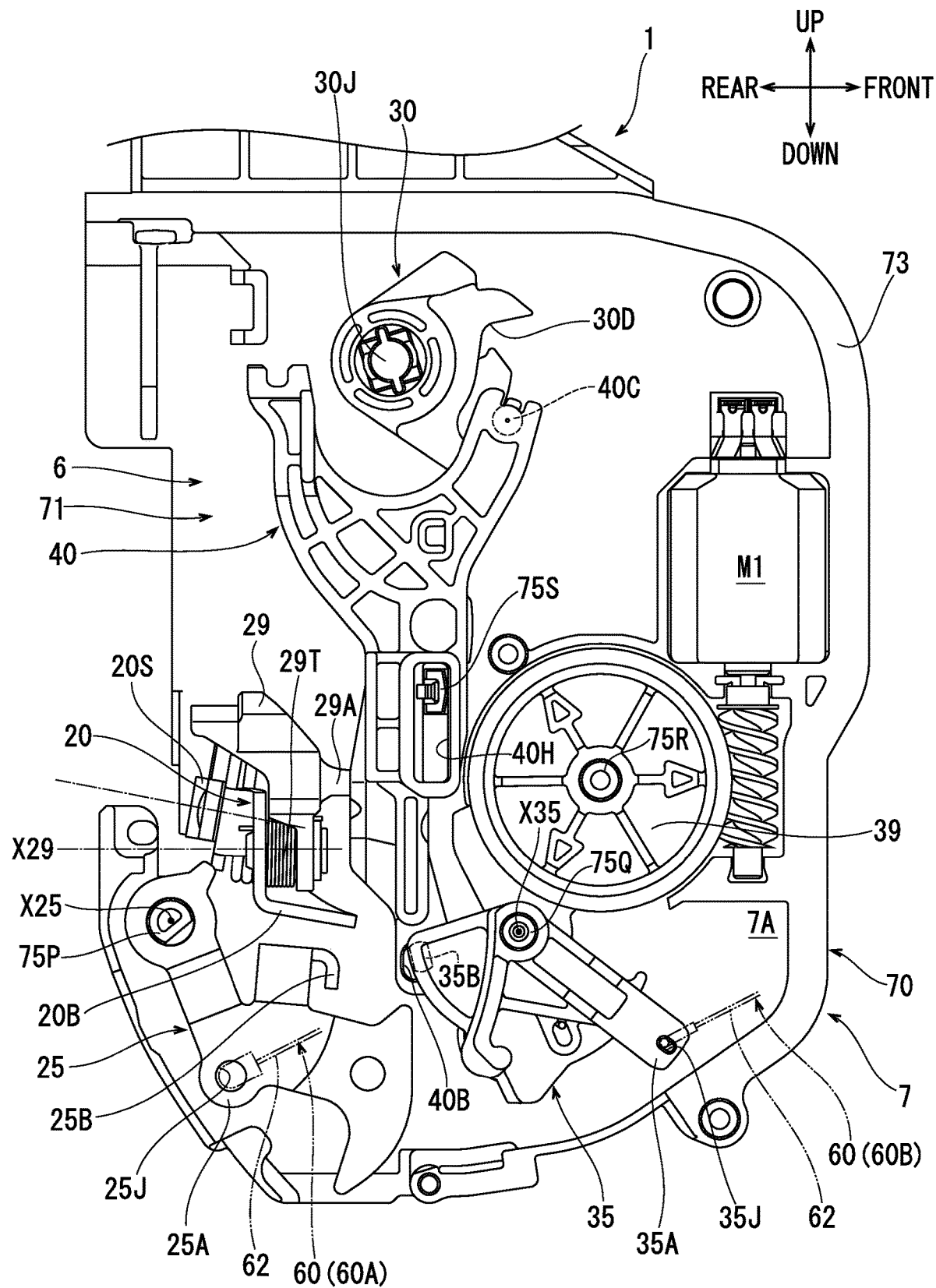
FIG. 4 is a front view of a first housing and an actuating mechanism.

As shown in FIG. 2, the first transmission cable 60 (60A) and the second transmission cable 60 (60B) are the same type of transmission cable that includes an outer cable 61 and the inner cable 62. The inner cable 62 is slidably housed within the outer cable 61 and has an end portion that is exposed at the terminal end of the outer cable 61. As will be explained in more detail below, the inner cable 62 of the first transmission cable 60 (60A) is connected to an inside open lever 25, which is shown in FIG. 4, etc. The inner cable 62 of the second transmission cable 60 (60B) is connected to an inside lock lever 35, which is also shown in FIG. 4, etc.

Figure 3:
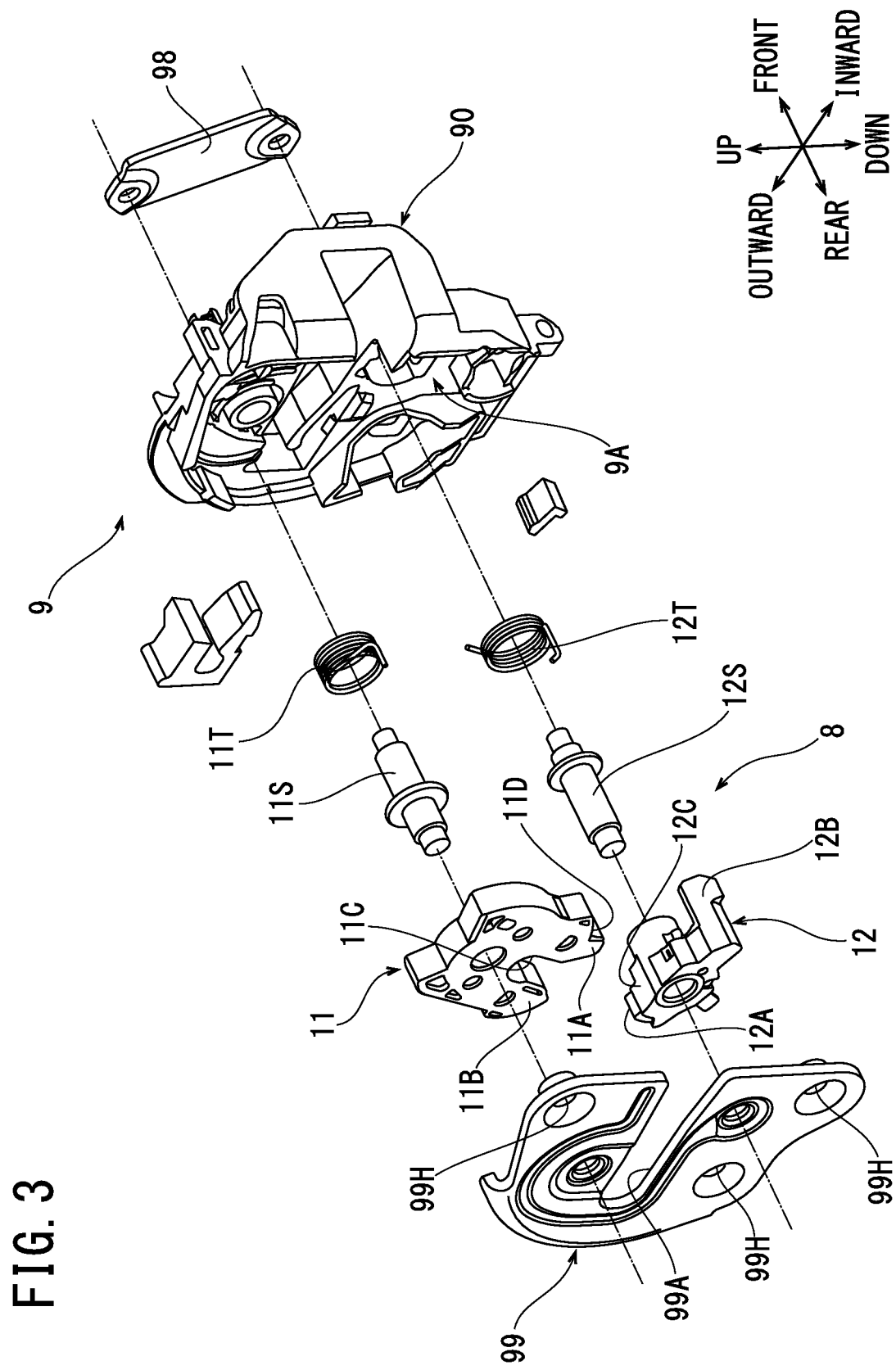
FIG. 3 is an exploded perspective view of a latch housing and a latch mechanism.

The door lock apparatus 1 includes a latch housing 9, as shown in FIGS. 1-3, and an actuating housing 7, as shown in FIGS. 1, 2, and 4-10. As shown in FIGS. 1 and 2, the actuating housing 7 is assembled onto (joined to) the latch housing 9. The latch housing 9 and the actuating housing 7 are representative, non-limiting examples of a housing according to the present teachings.

Figure 5:
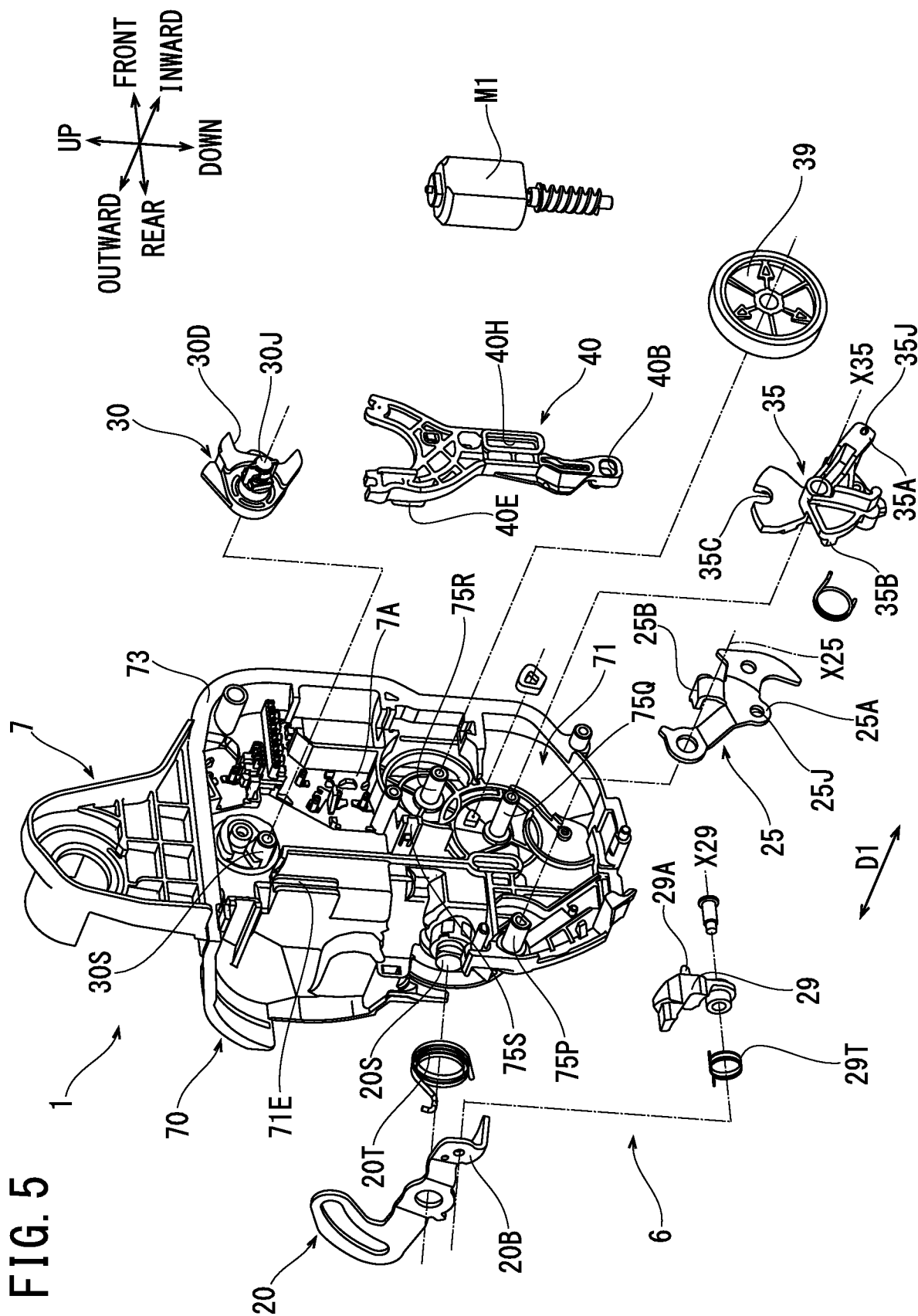
FIG. 5 is an exploded perspective view of the first housing and the actuating mechanism.
Figure 6:
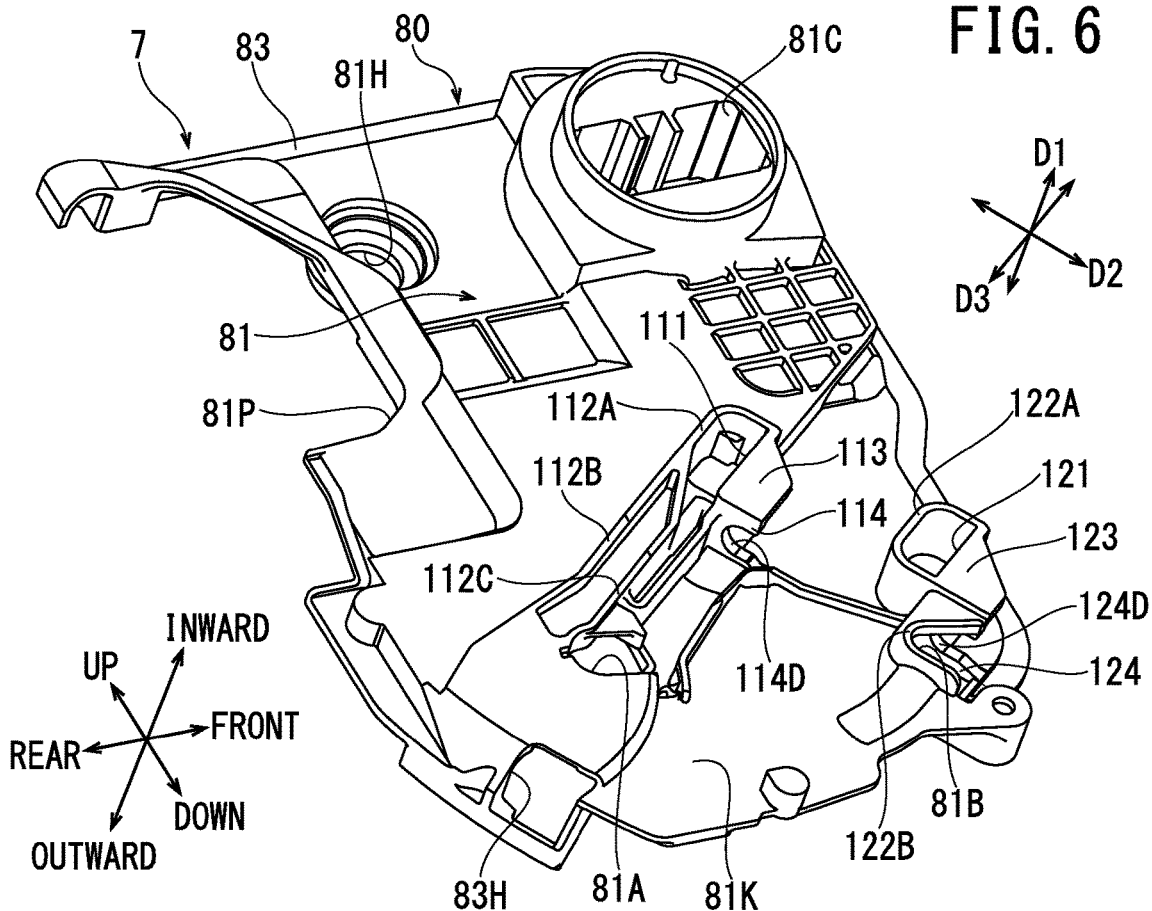
FIG. 6 is a perspective view of a second housing.
Figure 7:
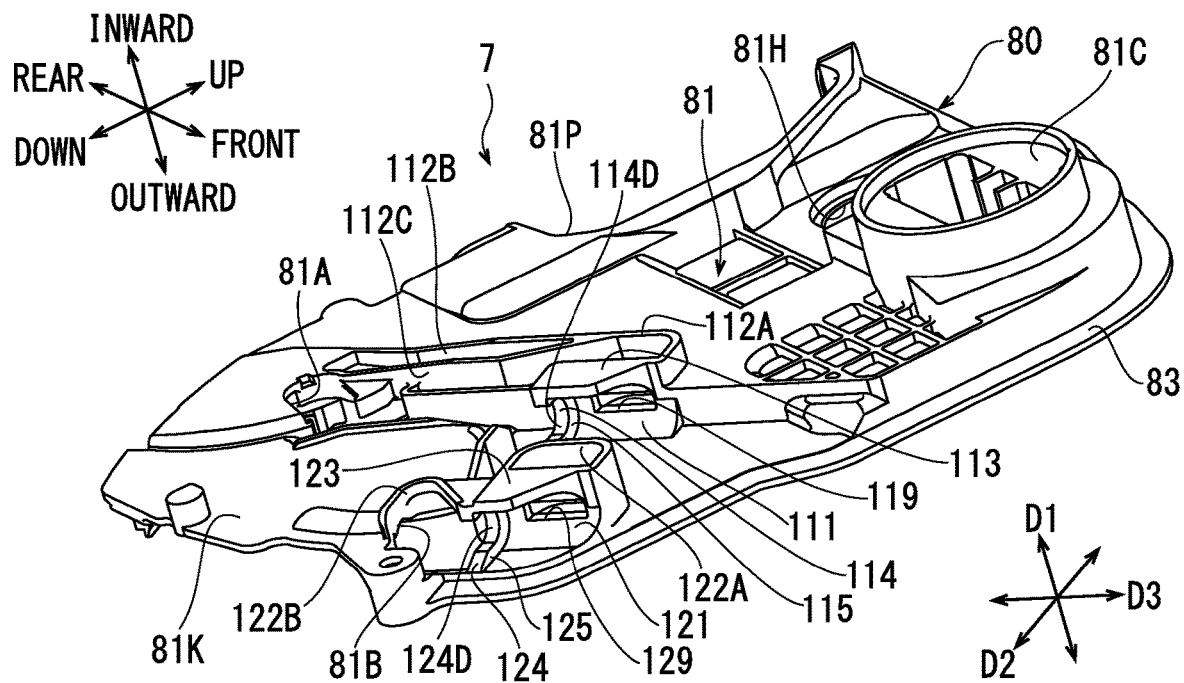
FIG. 7 is another perspective view of the second housing.
Figure 8:
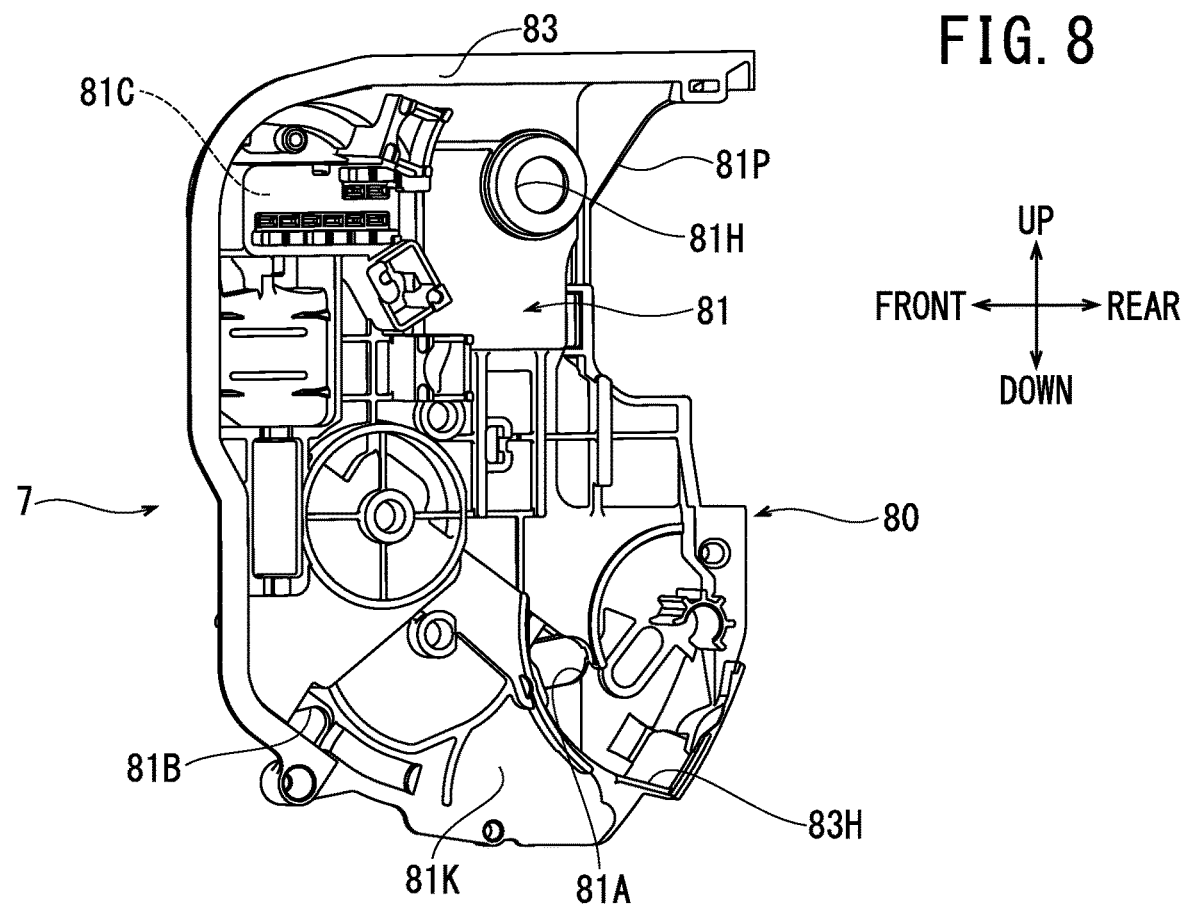
FIG. 8 is another perspective view of the second housing.

As shown, e.g., in FIGS. 5-8, the actuating housing 7 includes a first housing 70 and a second housing 80, each made of resin. As shown in FIGS. 1 and 5, the first housing 70 includes a first peripheral edge section 73 surrounding a first base wall 71. As shown in FIGS. 6 to 8, the second housing 80 includes a second peripheral edge section 83 surrounding a second base wall 81. The second housing 80 is superimposed on (overlaps) the first housing 70 in a first direction D1 that is at least substantially parallel to the vehicle inward-outward direction. During assembly, the first base wall 71 is oriented to face the second base wall 81, and the first peripheral edge section 73 and the second peripheral edge section 83 are welded. Consequently, a housing chamber 7A is formed in the interior of the actuating housing 7. An actuating mechanism 6, as shown in FIGS. 4, 5, and 9-14, is housed in the housing chamber 7A.

As shown in FIGS. 6 to 8, a relief section 81P, a through-hole 81H, and a connector 81C are formed in (on) an upper portion of the second base wall 81 of the second housing 80. As shown in FIG. 2, the relief section 81P is a cut out portion of the second housing 80 that forms a recess for receiving a portion of the latch housing 9. A coupling shaft 30J of the outside lock lever 30 is inserted through the through-hole 81H. A plurality of terminals T1 is located in the connector 81C; the tips of the terminals T1 are designed to be connected to electric components housed in the housing chamber 7A.

As shown in FIGS. 6 to 8, the second housing 80 also has a base wall 81K and first and second openings 81A and 81B.

The base wall 81K is a region of the second base wall 81 of the second housing 80 that is located below the relief section 81P, the through-hole 81H, and the connector 81C; the base wall 81K is a substantially plate-shaped (flat or planar) wall that extends in the front-rear direction and the up-down direction, which are both orthogonal to the vehicle inward-outward direction. It is noted that, although the base wall 81K includes steps, inclines, etc., the base wall 81K substantially only has to be a substantially plate-shaped wall. In other words, the base wall 81K extends in a second direction D2, which is at least substantially orthogonal to the first direction D1 that is substantially parallel to the vehicle inward-outward direction, and also extends in a third direction D3 that is at least substantially orthogonal to the first direction D1 and the second direction D2. The second direction D2 is inclined upward toward the rear and also extends in the opposite direction thereof. The third direction D3 is inclined downward toward the rear and also extends in the opposite direction thereof.

The first opening 81A is formed at a position close to a rear and lower corner of the base wall 81K. The first opening 81A passes through the base wall 81K such that a first path from the outside of the actuating housing 7 into the housing chamber 7A is provided thereby. The second opening 81B is formed at a position close to a front and lower corner of the base wall 81K. The second opening 81B also passes through the base wall 81K such that a second path from the outside of the actuating housing 7 into the housing chamber 7A is provided thereby.

As shown in FIG. 2, the inner cable 62 of the first transmission cable 60 (60A) is introduced into the housing chamber 7A by passing it through the first opening 81A from the outside of the actuating housing 7. Similarly, the inner cable 62 of the second transmission cable 60 (60B) is introduced into the housing chamber 7A by passing it through the second opening 81B from the outside of the actuating housing 7.

Figure 15:
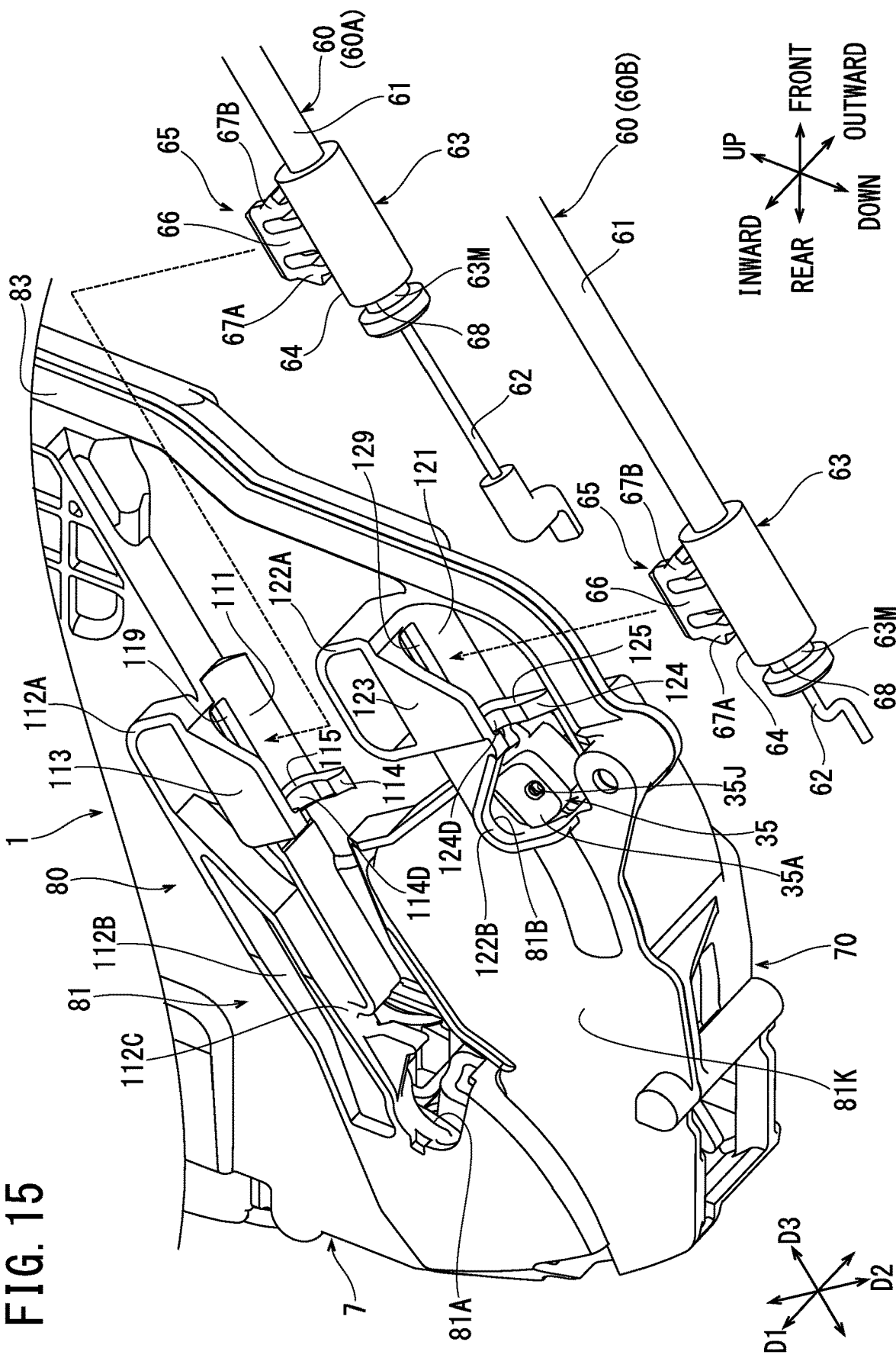
FIG. 15 is a partial perspective view for explaining an arrangement for mounting transmission cables on (in) the second housing.
Figure 16:
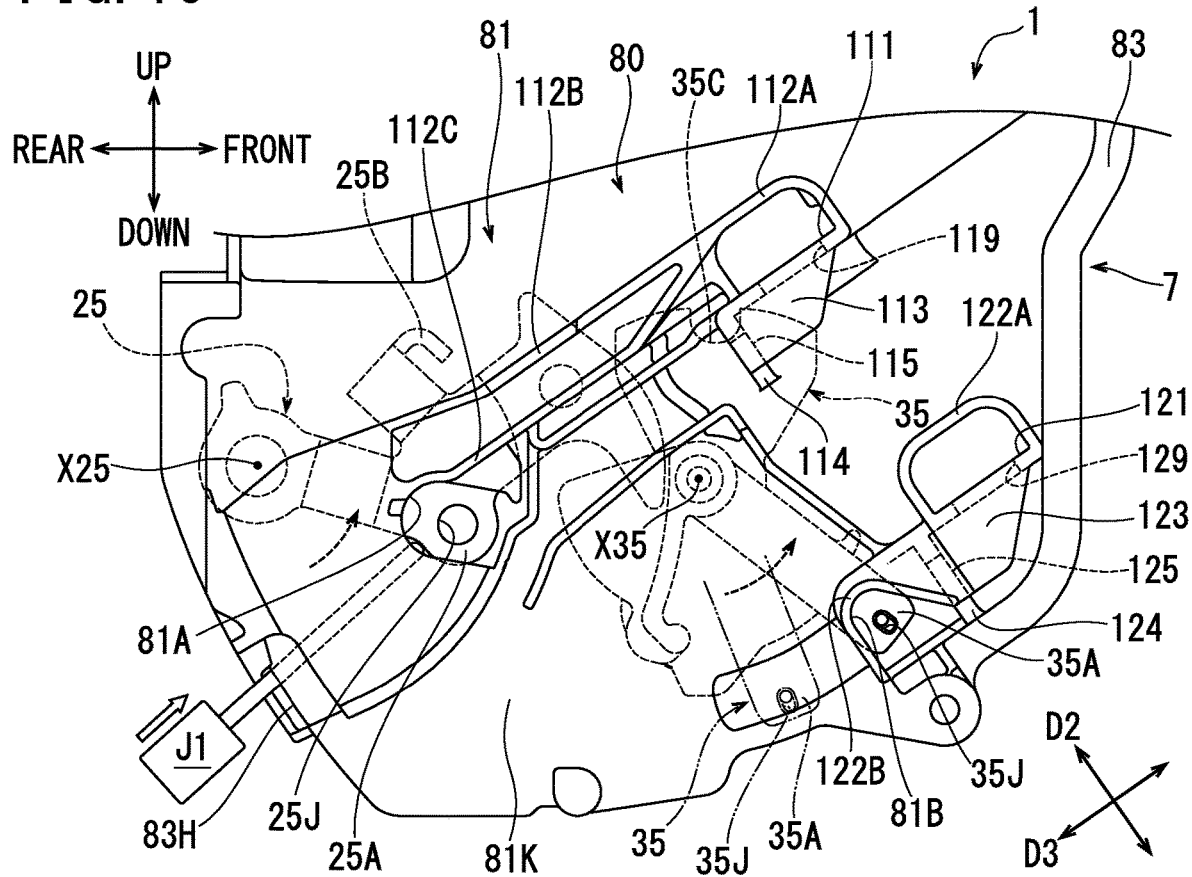
FIG. 16 is a partial front view that principally shows a linkage of an inside open lever, which rotates from an initial position to an operating position to be exposed to the outside through an opening, and a linkage of an inside lock lever, which is exposed to the outside through the opening in an unlocked state.
Figure 17:
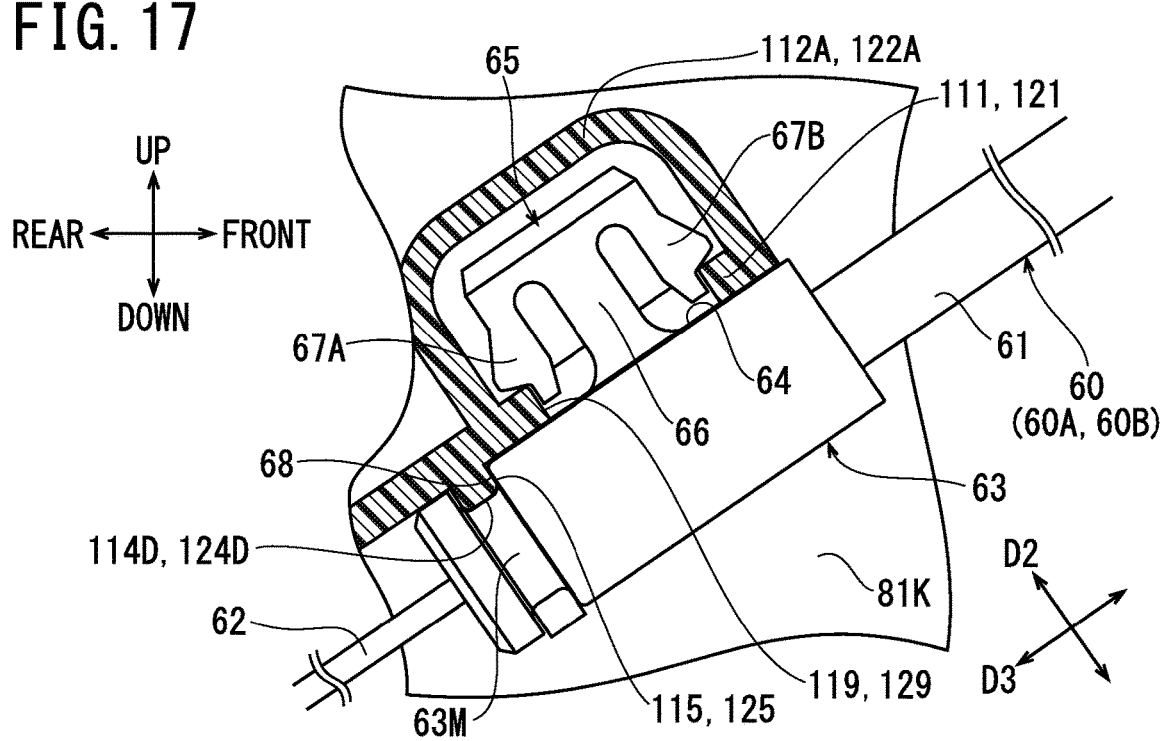
FIG. 17 is a partial sectional view showing an engaging part engaged with an engaged part.

Further, as shown in FIGS. 6, 7, 15 to 17, first concave walls 111 and 121, engaging holes 119 and 129, holding walls 113 and 123, positioning walls 114 and 124, and second walls 112A, 112B, 112C, 122A, and 122B are formed on (in) the second housing 80. The engaging holes 119 and 129 are representative, non-limiting examples of an "engaging part" according to the present teachings. Specific configurations of these elements are explained in more detail below. As shown in FIGS. 2, 15, and 17, the first casing cap 63 is provided at the first end of the outer cable 61 of the first transmission cable 60 (60A) and is fixed to the second housing 80 by the first concave wall 111, the engaging hole 119, etc. The second casing cap 63 is provided at the first end of the outer cable 61 of the second transmission cable 60 (60B) and is fixed to the second housing 80 by the first concave wall 121, the engaging hole 129, etc.

As shown in FIG. 3, the latch housing 9 is formed by sandwiching the third housing 90, which is made of resin, between a base plate 99 and a back plate 98, which are each made from steel plates, and joining (affixing) a fork pivot shaft 11S and a pawl pivot shaft 12S to the base plate 99 and the back plate 98. A latch chamber 9A is formed in the interior of the latch housing 9. A latch mechanism 8, as shown in FIGS. 2, 3, and 11-14, is housed in the latch chamber 9A.

As shown, e.g., in FIGS. 2 and 3, a plurality of fixing holes 99H and an entry opening 99A are formed in the base plate 99. Not-shown set screws are inserted through the rear end face of the door and are respectively screwed into the fixing holes 99H of the base plate 99, whereby the door lock apparatus 1 is affixed to the door such that the entry opening 99A is exposed at the rear end face of the door. When the door lock apparatus 1 moves in accordance with the opening and closing of the door, the striker fixed to the vehicle frame respectively separates (exits) from or enters into the entry opening 99A.

As shown in FIG. 3, the latch mechanism 8 includes a fork 11 and a pawl 12. The fork 11 is pivotably supported by a fork pivot shaft 11S, which is disposed above the entry opening 99A. A torsion coil spring 11T is attached to the fork pivot shaft 11S. The pawl 12 is pivotably supported by a pawl pivot shaft 12S, which is disposed below the entry opening 99A. A torsion coil spring 12T is attached to the pawl pivot shaft 12S.

Figure 11:
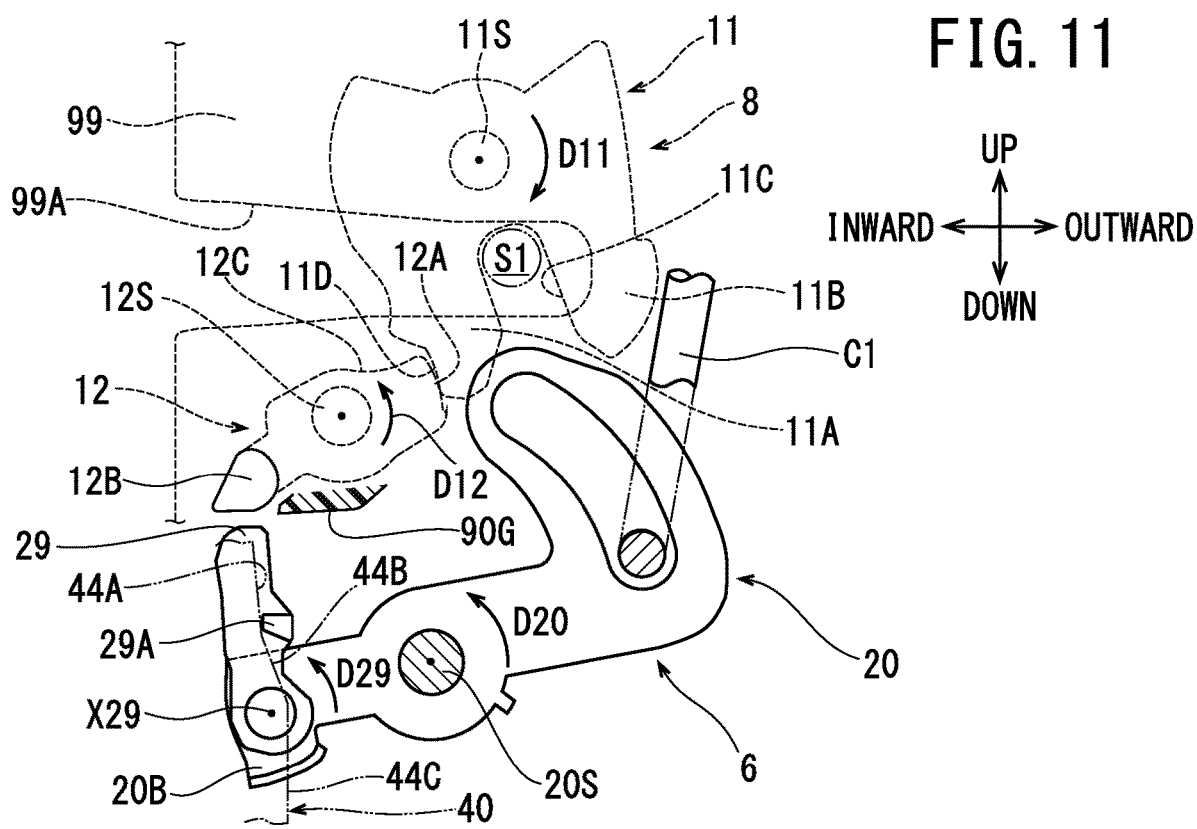
FIG. 11 is a first schematic view for explaining the operations of an outside open lever, an inertial lever, a fork, and a pawl.

As shown in FIG. 11, the fork 11 is urged (biased) by the torsion coil spring 11T so as to pivot about the fork pivot shaft 11S in the direction D11. The portion of the fork 11 that is located on the side of entry opening 99A has an inner convex segment 11A and an outer convex segment 11B. A striker S1, which is shown in FIG. 11 as having entered into the entry opening 99A, fits in a cutout 11C formed between the inner convex segment 11A and the outer convex segment 11B. In the state shown in FIG. 11, the fork 11 retains the striker S1 at the bottom of the entry opening 99A. A latch surface 11D configured to come into contact with a stopper surface 12A, which will be explained below, that is formed at (on) the distal end of the inner convex segment 11A that faces the pawl 12.

The pawl 12 is urged (biased) by the torsion coil spring 12T so as to pivot about the pawl pivot shaft 12S in the direction D12 and holds the posture (orientation) shown in FIG. 11.

The stopper surface 12A is formed in (on) a portion of the pawl 12 that is directed towards the bottom of the entry opening 99A in the orientation shown in FIG. 11. The stopper surface 12A is formed so as to face the latch surface 11D. An arc forming the stopper surface 12A is cut on the side that faces the fork 11. A sliding surface 12C that extends towards the pawl pivot shaft 12S is formed starting from the part (location) where the arc is cut. A contacted convex portion 12B is formed on the pawl 12 on the side that is opposite of the stopper surface 12A across the pawl pivot shaft 12S. As shown in FIG. 3, the contacted convex portion 12B projects forward and has a columnar shape. Although not shown in the figure, the front end of the contacted convex portion 12B projects frontward from the latch chamber 9A through the third housing 90 and enters the housing chamber 7A.

Referring again to FIG. 11, when the fork 11 retains (holds) the striker S1 at the bottom (base) of the entry opening 99A, the stopper surface 12A comes into contact with the latch surface 11D of the inner convex segment 11A, whereby the pawl 12 prevents the fork 11 from pivoting in the direction D11. The position of the fork 11 shown in FIG. 11 is the latch position that holds the striker S1 in the entry opening 99A.

Figure 12:
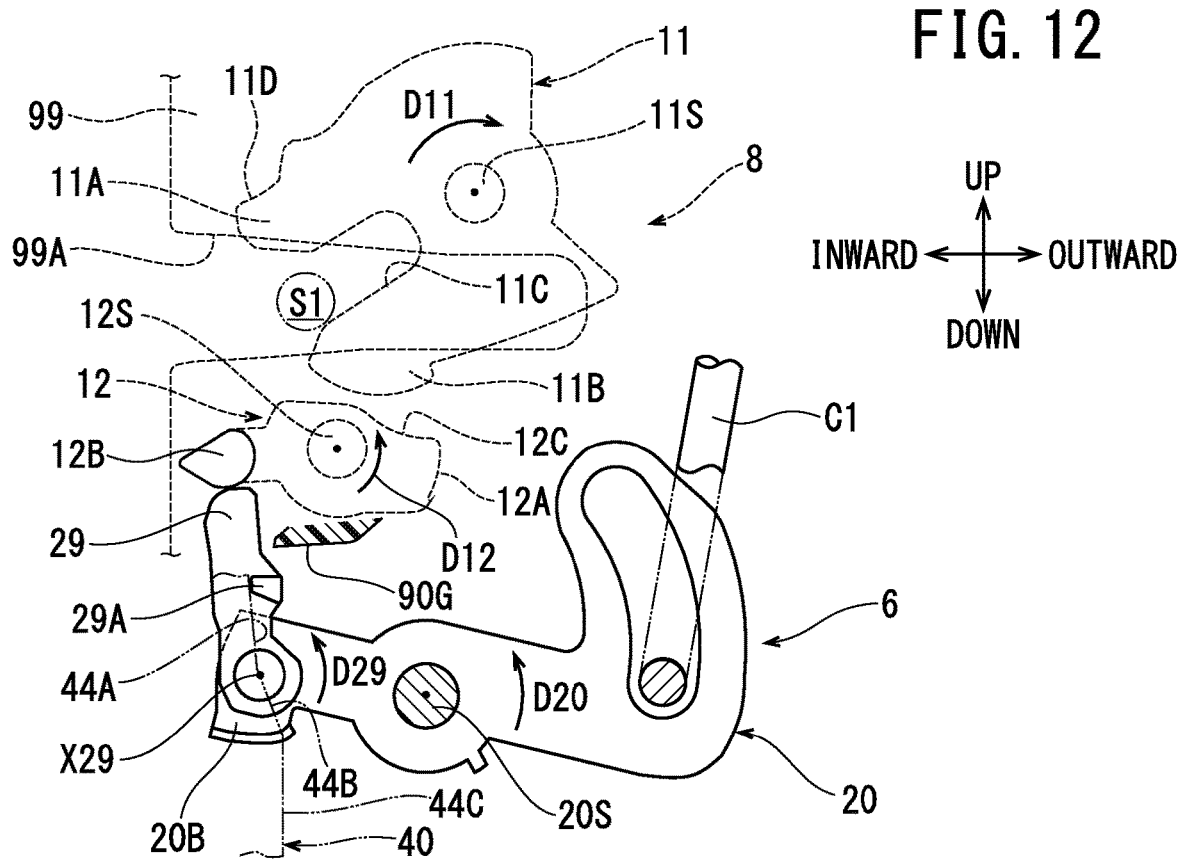
FIG. 12 is a second schematic view for explaining the operations of the outside open lever, the inertial lever, the fork, and the pawl.

As shown in FIG. 12, when an inertial lever 29, which will be explained below, comes into contact with the contacted convex portion 12B of the pawl 12 and pushes the contacted convex portion 12B up, the pawl 12 pivots about the pawl pivot shaft 12S in the direction opposite of the direction D12 by overcoming the urging force of the torsion coil spring 12T. At this time, since the stopper surface 12A separates from the latch surface 11D, the pawl 12 no longer blocks the pivoting movement of the fork 11. Therefore, the fork 11 pivots about the fork pivot shaft 11S in the direction D11 due to the urging force of the torsion coil spring 11T so as to displace to the unlatch position, where the striker S1 is permitted (released) to move out of (exit) the entry opening 99A.

Conversely, when the striker S1 enters the entry opening 99A, the striker S1 pushes against the outer convex segment 11B, thereby causing the fork 11 to pivot in the direction opposite of the direction D11 and to return from the unlatch position shown in FIG. 12 to the latch position shown in FIG. 11. At this time, the distal end of the outer convex segment 11B and then the distal end of the inner convex segment 11A sequentially come into slide-contact with the sliding surface 12C. When the inner convex segment 11A separates from the sliding surface 12C, the pawl 12 pivots in the direction D12 and returns to the original posture shown in FIG. 11. Therefore, the stopper surface 12A comes into contact with the latch surface 11D and fixes the pivoting movement of the fork 11 in the latch position. As a result, the latch mechanism 8 holds the door closed with respect to the vehicle frame.

As shown in FIGS. 4, 5, 9, and 10, the actuating mechanism 6 includes the outside open lever 20, the inside open lever 25, the inertial lever 29, the outside lock lever 30, the inside lock lever 35, a linearly moving lock lever 40, an electric motor M1, and a worm wheel 39. The inside open lever 25 and the inside lock lever 35 are representative, non-limiting examples of a "rotatable element" according to the present teachings.

As shown in FIG. 5, the first housing 70 includes an outside open lever pivot shaft 20S that projects rearward at (from) a rear and lower portion of the first wall 71.

As shown in FIGS. 4 and 5, a first shaft 75P is formed in (on) a rear and lower part of the first base wall 71 of the first housing 70. A second shaft 75Q is formed in (on) a part of the first base wall 71 that is farther forward than the first shaft 75P. A third shaft 75R and a fourth shaft 75S are formed in (on) a part located substantially in the center of the first base wall 71. The first shaft 75P, the second shaft 75Q, the third shaft 75R, and the fourth shaft 75S respectively extend toward the second base wall 81 of the second housing 80.

The first shaft 75P defines a first rotational axis X25 that extends in the first direction D1. The second shaft 75Q defines a second rotational axis X35 that also extends in the first direction D1 parallel to the first rotational axis X25.

As shown in FIGS. 4 and 5, the outside open lever 20 is pivotably supported by the outside open lever pivot shaft 20S. A torsion coil spring 20T is shown in FIG. 5 and is attached to the outside open lever pivot shaft 20S. As shown in FIG. 11, the outside open lever 20 is urged (biased) by the torsion coil spring 20T so as to pivot about the outside open lever pivot shaft 20S in the direction D20.

As shown in FIGS. 1 and 11, a first end of the outside open lever 20, which is located on the vehicle outward side, projects outward of the actuating housing 7. The lower end of a transmission rod C1 is coupled to the first end of the outside open lever 20.

As shown in FIGS. 4 and 5, the inertial lever 29 is supported by the other end 20B of the outside open lever 20 so as to be pivotable about a pivot axis X29 extending in the front-rear direction. As shown in FIG. 11, a torsion coil spring 29T (see FIG. 5) urges (biases) the inertial lever 29 so as to pivot about the pivot axis X29 in the direction D29.

When the exterior door handle H1 is operated (e.g., manually pulled) to open the door and the transmission rod C1 has moved downward as shown in FIG. 12, the one (outwardly-projecting) end of the outside open lever 20 is pushed down too. The outside open lever 20 pivots in the direction opposite of the direction D20, thereby raising the inertial lever 29 by overcoming the urging force of the torsion coil spring 20T shown in FIG. 5.

As shown in FIGS. 4 and 5, the inside open lever 25 is rotatably supported by the first shaft 75P that defines the first rotational axis X25. A linkage 25J, e.g., a through hole, is formed at (in) one end 25A of the inside open lever 25 that is located downward from the first shaft 75P. The first end of the inner cable 62 of the first transmission cable 60 (60A) is operably coupled (linked) to the linkage 25J of the inside open lever 25. That is, the inside open lever 25 is operably coupled to the interior door handle H4 via the first transmission cable 60(60A). By reciprocally moving (sliding) the inner cable 62 of the first transmission cable 60 (60A) relative to the outer cable 61, the inside open lever 25 rotates around the first rotational axis X25.

Figure 10:
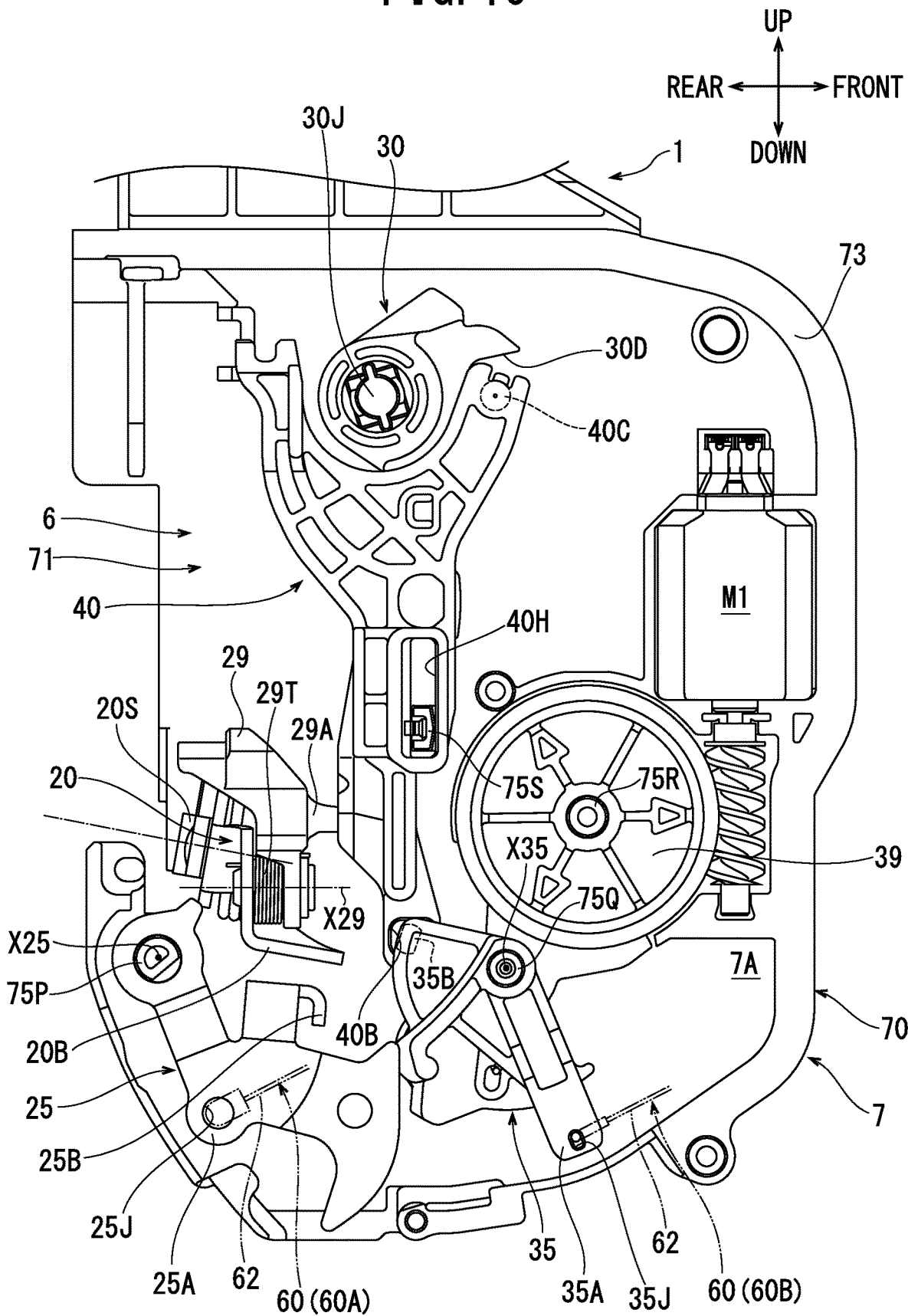
FIG. 10 is another front view of the first housing and the actuating mechanism.

Still referring to FIGS. 4 and 5, an operating part 25B is formed on a part above the one end 25A of the inside open lever 25. The inside open lever 25 is located at its initial position (origin), as shown in FIGS. 4 and 10, when the interior door handle H4 is not being operated (manipulated, pulled, etc.) to open the door. The operating part 25B of the inside open lever 25 is spaced downward with respect to the other end 20B of the outside open lever 20. The inside open lever 25 pivots counterclockwise to be displaced to the operating position shown in FIG. 16 when the interior door handle H4 is operated (e.g., manually pulled) to open the door. Consequently, the operating part 25B pushes the other end 20B of the outside open lever 20 up and raises the inertial lever 29 by overcoming the urging force of the torsion coil spring 20T shown in FIG. 5. When the interior door handle H4 is no longer being manipulated (pulled, lifted, etc.), e.g., when the interior door handle H4 is released by the passenger, the inside open lever 25 returns to its initial position (origin) shown in FIGS. 4 and 10 owing to the urging force of the torsion coil spring 20T shown in FIG. 5.

When the inside open lever 25 is located in (rotated counterclockwise to) the operating position shown in FIG. 16, the linkage 25J is exposed to the outside through the first opening 81A. On the other hand, when the inside open lever 25 is located at (in) its initial position shown in FIGS. 4 and 10, the linkage 25J is spaced farther away from the first opening 81A in the rearward and downward directions and is not exposed to the outside.

As shown in FIGS. 2, 6, 8, and 16, a jig (tool) insertion hole 83H is provided at (in, through) a rear and lower corner of the second peripheral edge section 83 of the second housing 80. Prior to coupling (linking) the inner cable 62 of the first transmission cable 60 (60A) to the inside open lever 25 during assembly of the apparatus 1, a jig (tool) J1 is inserted through the jig insertion hole 83H into the housing chamber 7A and pushes (rotates counterclockwise) the one end 25A of the inside open lever 25 as shown in FIG. 16, whereby the inside open lever 25 is rotated to the operating position and the linkage 25J is exposed to the outside through the first opening 81A. Consequently, the first end of the inner cable 62 of the first transmission cable 60 (60A) can be easily coupled (linked) to the linkage 25J of the inside open lever 25. Thereafter, the jig J1 is removed from the jig insertion hole 83H, whereby the inside open lever 25 returns to its initial position shown in FIGS. 4 and 10 owing to the urging (biasing) force of the torsion coil spring 20T shown in FIG. 5. As a result, the linkage 25J is spaced farther away from the first opening 81A and is no longer exposed to the outside.

As shown in FIG. 5, the first housing 70 also includes an outside lock lever pivot shaft 30S that projects from an upper portion of the first base wall 71 toward the vehicle interior.

The outside lock lever 30 is pivotably supported by the outside lock lever pivot shaft 30S. An engaging concave segment 30D is formed as a recess in the outside lock lever 30 and bends in the radial inward direction. The outside lock lever 30 includes a coupling shaft 30J that projects toward the vehicle interior. As shown in FIG. 2, the coupling shaft 30J projects outward of the second housing 80. The link lever C2C is fixed to the distal end portion of the coupling shaft 30J so as to be integrally rotatable therewith.

As shown in FIGS. 4 and 5, the outside lock lever 30 pivots counterclockwise in response to a locking operation being performed on the key cylinder H2. On the other hand, the outside lock lever 30 pivots clockwise in response to an unlocking operation being performed on the key cylinder H2.

The inside lock lever 35 is pivotably supported by the second shaft 75Q that defines the second rotational axis X35. A linkage 35J, e.g., a through hole, is formed at (in) the one end 35A of the inside lock lever 35. The first end of the inner cable 62 of the second transmission cable 60 (60B) is operably coupled (linked) to the linkage 35J of the inside lock lever 35. That is, the inside lock lever 35 is operably coupled to the interior door lock knob H3 via the second transmission cable 60(60B). By reciprocally moving (sliding) the inner cable 62 of the second transmission cable 60 (60B) relative to the outer cable 61, the inside lock lever 35 rotates around the second rotational axis X35.

The inside lock lever 35 pivots from the position shown in FIG. 4 to the position shown in FIG. 10 in response to a locking operation being performed on the interior door lock knob H3. The inside lock lever 35 pivots from the position shown in FIG. 10 to the position shown in FIG. 4 in response to an unlocking operation being performed on the interior door lock knob H3.

Figure 9:
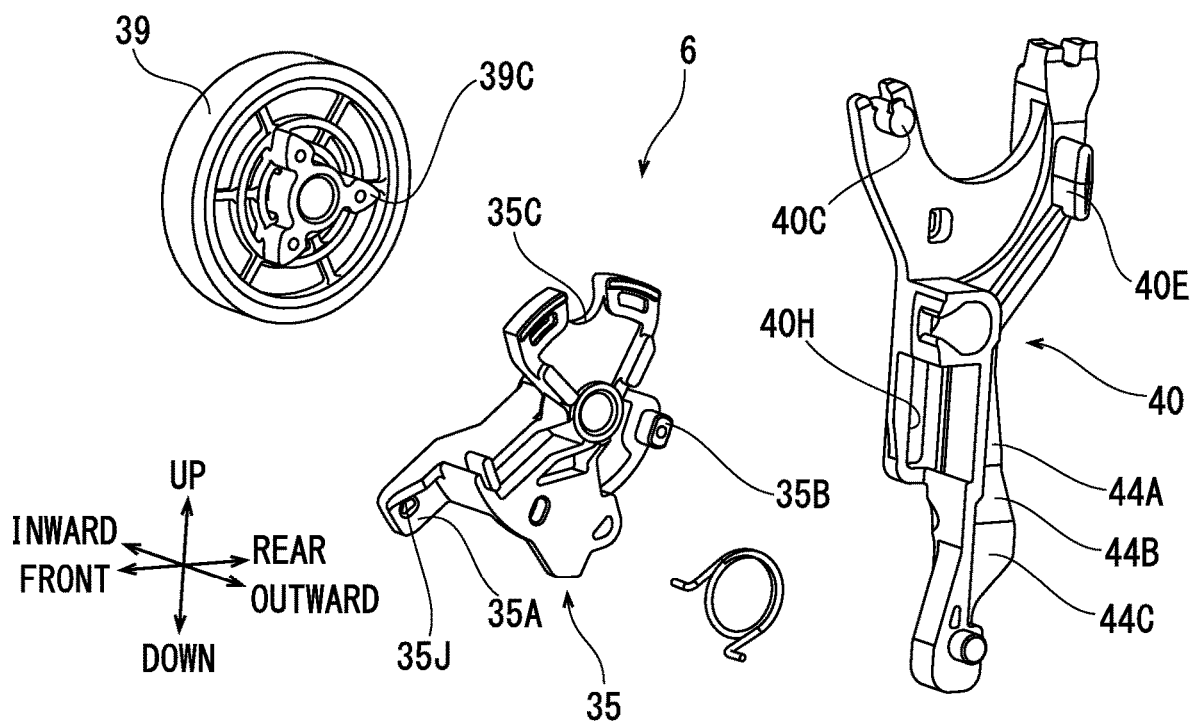
FIG. 9 is an exploded perspective view of a worm wheel, an inside lock lever, and a linearly moving lock lever.

As shown in FIGS. 4 and 5, a cam 35C is formed in an upper part of the inside lock lever 35. As shown in FIG. 9, an operating part 35B projects toward the vehicle exterior from the surface of the inside lock lever 35 that faces the vehicle exterior.

As shown in FIGS. 4 and 5, the worm wheel 39 is rotatably (turnably) supported by the third shaft 75R. As shown in FIG. 9, a cam section 39C configured to engage with the cam 35C of the inside lock lever 35 is formed on the surface of the worm wheel 39 that faces the vehicle exterior. When the electric motor M1 is actuated in response to a locking operation or an unlocking operation requested by a remote control key or the like, the worm wheel 39 is driven by the electric motor M1 to rotate and thereby rotates (pivots) clockwise or counterclockwise. Due to the engagement of the cam section 39C and the cam 35C, the worm wheel 39 causes the inside lock lever 35 to rotate (pivot) between the position shown e.g., in FIG. 4 and the position shown in FIG. 10.

As shown in FIGS. 4 and 5, the fourth shaft 75S is inserted through an elongated hole 40H that extends in the up-down direction, whereby the linearly moving lock lever 40 is supported by the fourth shaft 75S so as to be linearly movable. The linearly moving lock lever 40 has a substantial "Y" shape that forks above the elongated hole 40H.

As shown in FIGS. 5 and 9, a linearly moving convex segment 40E projects toward the vehicle exterior from a part of the linearly moving lock lever 40 that branches rearward and upward. As shown in FIG. 5, a linear-movement guide groove 71E extends in the up-down direction at a location that is upward and rearward relative to the fourth shaft 75S; the linear-movement guide groove 71E is formed as a recess in the first base wall 71 of the first housing 70. The linearly moving convex segment 40E is guided by the linear-movement guide groove 71E, whereby the linearly moving lock lever 40 is capable of linearly moving in the up-down direction without inclining (tilting).

As shown in FIGS. 4 and 5, a concave recess 40B is formed in the lower end portion of the linearly moving lock lever 40. As shown in FIGS. 4 and 10, the operating part 35B of the inside lock lever 35 engages in the concave recess 40B.

As shown in FIG. 9, an engaging convex part 40C projects toward the vehicle exterior at the distal end of a part of the linearly moving lock lever 40 that branches forward and upward. As shown in FIGS. 4 and 10, the engaging convex part 40C projects into the engaging concave segment 30D of the outside lock lever 30.

When the inside lock lever 35 pivots from the position shown in FIG. 4 to the position shown in FIG. 10 in response to a locking operation being performed on the interior door lock knob H3 or a locking operation requested by the remote control key or the like, the displacement of the inside lock lever 35 is transmitted to the linearly moving lock lever 40 via the concave recess 40B and the operating part 35B. As a result thereof, the linearly moving lock lever 40 is pushed up from the position shown in FIG. 4 to the position shown in FIG. 10.

When the inside lock lever 35 pivots from the position shown in FIG. 10 to the position shown in FIG. 4 in response to an unlocking operation being performed on the interior door lock knob H3 or an unlocking operation requested by the remote control key or the like, the displacement of the inside lock lever 35 is transmitted to the linearly moving lock lever 40 via the concave recess 40B and the operating part 35B. As a result thereof, the linearly moving lock lever 40 is pulled down from the position shown in FIG. 10 to the position shown in FIG. 4.

When the outside lock lever 30 pivots counterclockwise in response to the locking operation being performed on the key cylinder H2, the displacement of the outside lock lever 30 is transmitted to the linearly moving lock lever 40 via the engaging concave segment 30D and the engaging convex part 40C. As a result thereof, the linearly moving lock lever 40 is lifted (pulled up) from a position shown in FIG. 4 to the position shown in FIG. 10.

When the outside lock lever 30 pivots clockwise in response to the unlocking operation being performed on the key cylinder H2, the displacement of the outside lock lever 30 is transmitted to the linearly moving lock lever 40 via the engaging concave segment 30D and the engaging convex part 40C. As a result thereof, the linearly moving lock lever 40 is pushed down from the position shown in FIG. 10 to the position shown in FIG. 4.

As shown in FIGS. 9 and 11-14, a first surface 44A, a second surface 44B, and a third surface 44C are formed on the linearly moving lock lever 40 between the elongated hole 40H and the concave recess 40B. The first surface 44A, the second surface 44B, and the third surface 44C are formed on a surface of the linearly moving lock lever 40 that faces the vehicle exterior. The first surface 44A and the third surface 44C are both flat surfaces that extend in the up-down direction. The first surface 44A is displaced (shifted) more toward the vehicle interior than the third surface 44C. The second surface 44B is an inclined surface that connects to the lower end of the first surface 44A with the upper end of the third surface 44C.

As shown in FIGS. 4, 5, and 11-14, a projection 29A projects forward from the front surface of the inertial lever 29. The projection 29A comes into slide-contact with the first surface 44A, the second surface 44B, and the third surface 44C in response to the linear movement of the linearly moving lock lever 40.

As shown in FIGS. 11 to 14, an inertial lever guide surface 90G is formed on the third housing 90 (see FIG. 3), more specifically, on the front surface side of the third housing 90 that faces forward towards the housing chamber 7A. The inertial lever guide surface 90G is a downward flat surface located farther towards the vehicle exterior than the contacted convex portion 12B of the pawl 12. The inertial lever guide surface 90G extends toward the vehicle exterior so as to separate (be spaced) from the contacted convex portion 12B. As shown in FIG. 11, when the outside open lever 20 has not yet been pivoted, the inertial lever guide surface 90G is located between the lower end of the contacted convex portion 12B and the upper end of the inertial lever 29 in the up-down direction.

The position of the linearly moving lock lever 40 shown in FIGS. 11 and 12 is the same as the position of the linearly moving lock lever 40 shown in FIG. 4. The position of the linearly moving lock lever 40 shown in FIGS. 13 and 14 is the same as the position of the linearly moving lock lever 40 shown in FIG. 10.

When the linearly moving lock lever 40 is located at the position shown, e.g., in FIGS. 11 and 12, the projection 29A of the inertial lever 29 comes into contact with the first surface 44A of the linearly moving lock lever 40, whereby the inertial lever 29 is retained in an upward position. In the state shown in FIG. 12, if the inertial lever 29 rises, the inertial lever 29 comes into contact with the contacted convex portion 12B and causes the pawl 12 to open the fork 11.

Figure 13:
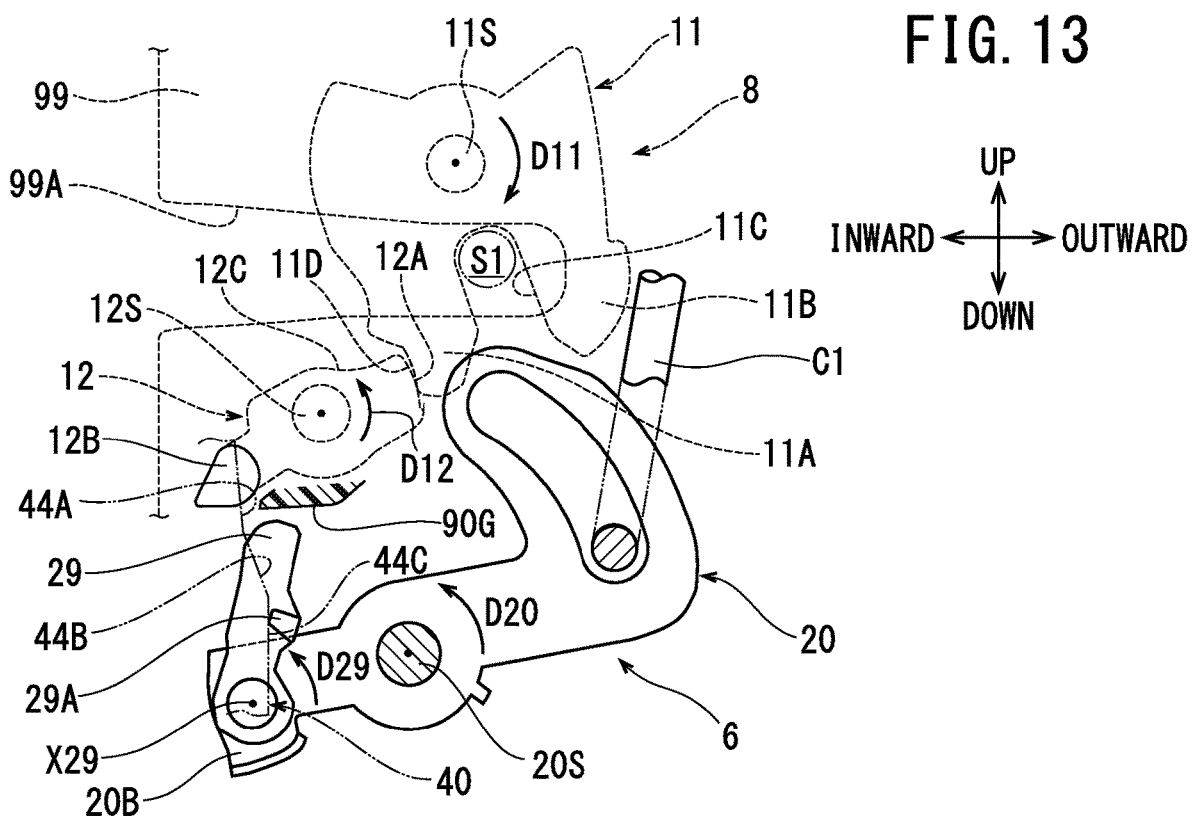
FIG. 13 is a third schematic view for explaining the operations of the outside open lever, the inertial lever, the fork, and the pawl.
Figure 14:
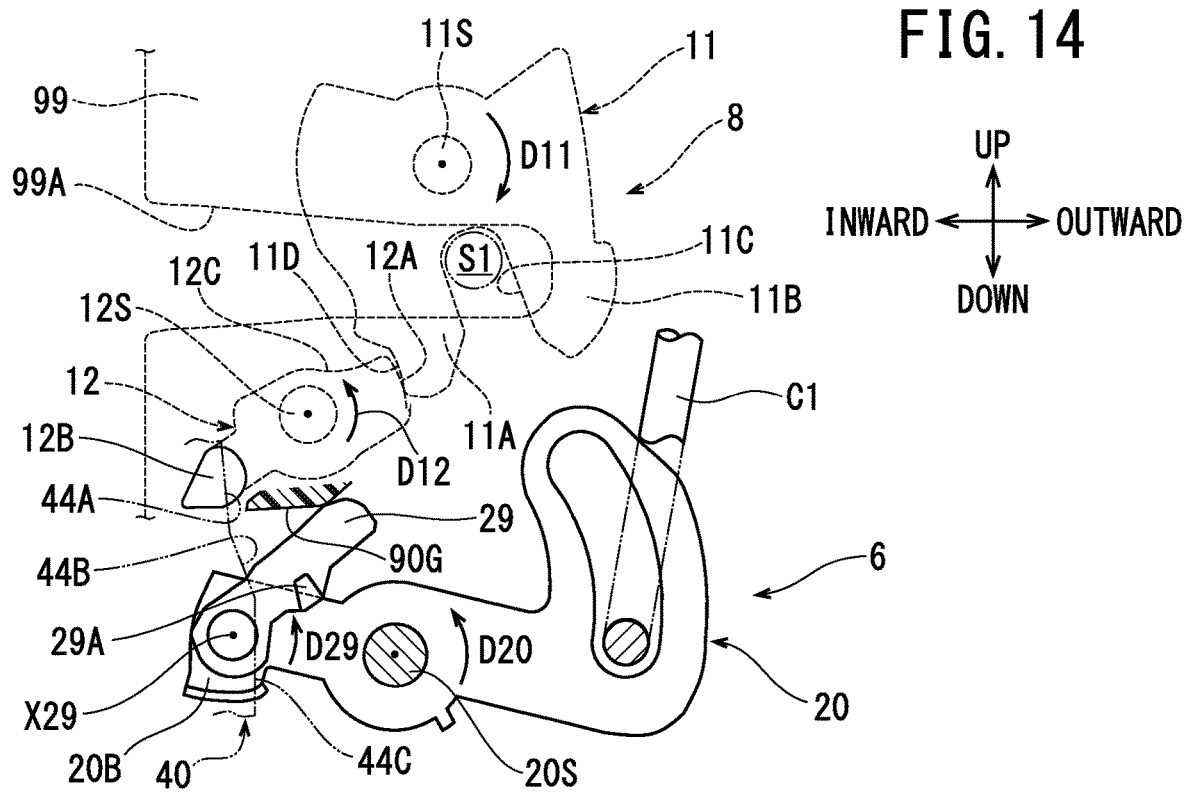
FIG. 14 is a fourth schematic view for explaining the operations of the outside open lever, the inertial lever, the fork, and the pawl.

When the linearly moving lock lever 40 is displaced to the position shown in FIGS. 10, 13, and 14, the projection 29A of the inertial lever 29 comes into slide-contact with the second surface 44B of the linearly moving lock lever 40 and then comes into contact with the third surface 44C, whereby the inertial lever 29 is held inclined toward the vehicle exterior. In the state shown in FIG. 14, if the inertial lever 29 rises, the inertial lever 29 comes into contact with the inertial lever guide surface 90G, the inertial lever 29 separates from the contacted convex portion 12B, and the pawl 12 continues to fix (retain) the fork 11.

The position of the inertial lever 29 shown in FIGS. 11 and 12 is an unlock position where the inertial lever 29 is capable of acting on the pawl 12. The position of the inertial lever 29 shown in FIGS. 13 and 14 is a lock position where the inertial lever 29 is incapable of acting on the pawl 12. In the position shown in FIGS. 10, 13, and 14, the third surface 44C comes into contact with the projection 29A and the linearly moving lock lever 40 retains the inertial lever 29 in the lock position. The position of the linearly moving lock lever 40 shown in FIGS. 10, 13, and 14 is a locked position.

In the position shown in FIGS. 4, 11, and 12, the third surface 44C separates (is spaced) from the projection 29A and the linearly moving lock lever 40 does not hold the inertial lever 29 in the lock position shown in FIGS. 13 and 14. The inertial lever 29 brings the projection 29A into contact with the first surface 44A due to the urging force of the torsion coil spring 29T. When an impact (shock or impulse) acts on the inertial lever 29, the inertial lever 29 causes the projection 29A to separate from the first surface 44A and is displaced to the lock position. The position of the linearly moving lock lever 40 shown in FIGS. 4, 11, and 12 is an unlocked position.

In the unlocked position shown in FIGS. 4, 11, and 12, the linearly moving lock lever 40 causes the inertial lever 29 to stand upright and enables the fork 11 located in the latch position shown in FIG. 11 to be displaced to the unlatch position shown in FIG. 12. In the locked position shown in FIGS. 10, 13, and 14, the linearly moving lock lever 40 inclines the inertial lever 29 and disables the fork 11 located in the latch position shown in FIG. 11 from being displaced to the unlatch position shown in FIG. 12.

That is, in an unlocked state in which the linearly moving lock lever 40 is in an unlocked position, actuation of the actuating mechanism 6 for the latch mechanism 8 is enabled. In a locked state in which the linearly moving lock lever 40 is in a locked position, the actuation of the actuating mechanism 6 for the latch mechanism 8 is disabled.

In the unlocked state, the linkage 35J of the inside lock lever 35 is exposed to the outside through the second opening 81B as indicated by a solid line in FIG. 16. In the locked state, the linkage 35J is spaced farther away from the second opening 81B in the rearward and downward directions and is not exposed to the outside as indicated by an alternating long and two short dashed line in FIG. 16.

When the second transmission cable 60 (60B) will be coupled (linked) to the inside lock lever 35 during assembly of the apparatus 1, the linearly moving lock lever 40 is located in the unlocked position such that the linkage 35J of the inside lock lever 35 is exposed to the outside through the second opening 81B as indicated by the solid line in FIG. 16. Consequently, it is possible to easily couple (link) the first end of the inner cable 62 of the second transmission cable 60 (60B) to the linkage 35J of the inside lock lever 35 through the second opening 81B.

The above-described representative door lock apparatus 1, which has such a configuration, can hold the door closed with respect to the vehicle frame, open the door, and lock and unlock the door in the closed state in response to different types of operation performed by an occupant of the vehicle.

Now, an embodiment for fixing the casing caps 63 of the first and second transmission cables 60 (60A, 60B) to the second housing 80 will be described with reference to FIGS. 15 and 17. As shown therein, the casing cap 63 has a contact part 64 and an engaged part 65. The contact part 64 is a cylindrical outer circumferential surface of the casing cap 63. The engaged part 65 includes an insertion part 66 and first and second engaging claws 67A and 67B attached thereto.

The insertion part 66 is formed in a substantially square columnar shape and projects radially outward from an axially intermediate segment of the contact part 64 of the casing cap 63. The first and second engaging claws 67A and 67B are integrally formed at the distal end portion of the insertion part 66. The first engaging claw 67A is connected to a rear side corner of the distal end portion of the insertion part 66. The second engaging claw 67B is connected to a front side corner of the distal end portion of the insertion part 66. The first and second engaging claws 67A and 67B initially extend in opposite directions in the axial direction of the casing cap 63 and thereafter bend and respectively project radially inward toward the contact part 64 of the casing cap 63. The distal end portions of the first and second engaging claws 67A and 67B each have a recess that forms a step shape.

When the casing cap 63 is fixed to the second housing 80, the axial direction of the casing cap 63 becomes parallel to the third direction D3. The contact part 64 extends in the third direction D3 and the insertion part 66 projects in the second direction D2.

An annular groove 63M is formed as a recess in the distal end portion of the casing cap 63; a portion of the inner cable 62 is exposed adjacent to the distal end portion of the casing cap 63. The inner wall surface of the annular groove 63M that faces in the same direction as the exposed portion of the inner cable 62 serves as a second positioning segment 68, which interacts with a first positioning segment 115, 125 that will be described below.

As shown in FIGS. 6, 7, and 15 to 17, the first concave wall 111 is formed as a wall that projects from the base wall 81K in the first direction D1 and extends along the third direction D3. In other words, the first concave wall 111 projects (protrudes) from the base wall 81K toward the vehicle interior and extends so as to incline downward toward the first opening 81A located at the rear side of the actuating housing 7.

The first concave wall 121 is disposed at a position spaced apart (separated) from the first concave wall 111 in the downward and forward directions. Like the first concave wall 111, the first concave wall 121 also is formed as a wall that projects from the base wall 81K in the first direction D1 and extends along the third direction D3. In other words, the first concave wall 121 projects (protrudes) from the base wall 81K toward the vehicle interior and extends so as to incline downward toward the second opening 81B located at the rear side of the actuating housing 7.

As shown in FIGS. 7 and 15 to 17, the engaging hole 119 passes through the first concave wall 111 in the second direction D2 and is parallel to the third direction D3. Like the engaging hole 119, the engaging hole 129 passes through the first concave wall 121 in the second direction D2 and also is parallel to the third direction D3. As shown in FIG. 7, the engaging holes 119 and 129 are both rectangular (slit-shaped) holes having the same shape and are arranged such that the two short sides of the rectangle (slit shape) extend in the first direction D1 and the two long sides of the rectangle (slit shape) extend in the third direction D3.

As shown in FIGS. 7 and 15, the portion of the first concave wall 111 between the engaging hole 119 and the base wall 81K is formed as a curved (concave) surface that matches (mates with) the outer cylindrical surface of the contact part 64 of the casing cap 63 of the first transmission cable 60 (60A). Similarly, the portion of the first concave wall 121 between the engaging hole 129 and the base wall 81K is also formed as a curved (concave) surface that matches (mates with) the outer cylindrical surface of the contact part 64 of the casing cap 63 of the second transmission cable 60 (60B).

The holding wall 113 is formed as a wall that projects downward from the distal (inward) end of the first concave wall 111 adjacent to the engaging hole 119 and extends parallel to the base wall 81K. Similarly, the holding wall 123 is formed as a wall that projects downward from the distal (inward) end of the first concave wall 121 adjacent to the engaging hole 129 and also extends parallel to the base wall 81K. The distance (spacing) between the holding wall 113 and the base wall 81K in the first direction D1 is set slightly larger than the outer diameter of the contact part 64.

The positioning wall 114 is formed as a wall that projects from the base wall 81K in the first direction D1 and extends along the second direction D2. The positioning wall 114 is connected to the first concave wall 111 at a position rearward of the engaging hole 119. The distal (inward) end of the positioning wall 114 is connected to the holding wall 113.

The positioning wall 124 is also formed as a wall that projects from the base wall 81K in the first direction D1 and extends along the second direction D2. The positioning wall 124 is connected to the first concave wall 121 at a position rearward of the engaging hole 129. The distal (inward) end of the positioning wall 124 is connected to the holding wall 123.

A fitting concave part 114D is formed in (on) the positioning wall 114 for engaging (fitting) in the annular groove 63M of the casing cap 63 of the first transmission cable 60 (60A). Similarly, a fitting concave part 124D is formed in (on) the positioning wall 124 for engaging (fitting) in the annular groove 63M of the casing cap 63 of the second transmission cable 60 (60B).

The first positioning segment 115, which was mentioned above, is formed on the surface of the positioning wall 114 that faces the engaging hole 119 in the third direction D3. Similarly, a first positioning segment 125 is formed on the surface of the positioning wall 124 that faces the engaging hole 129 in the third direction D3.

The second wall 112A is formed as a wall that projects from the base wall 81K in the first direction D1 and curves substantially in a C shape. The second wall 112A surrounds the periphery of the engaging hole 119 that passes through the first concave wall 111 in the upward, rearward direction (see FIG. 17). The second walls 112B and 112C are connected to the rear end portion of the second wall 112A and branch apart in the up-down direction as they extend in the rearward direction. The second walls 112B and 112C are formed as walls that project from the base wall 81K in the first direction D1. The distal end of the second wall 112C in the direction D3 inclines rearward and downward and thus partially surrounds the first opening 81A in the direction D2.

The second wall 122A is also formed as a wall that projects from the base wall 81K in the first direction D1 and curves substantially in a C shape. The second wall 122A surrounds the periphery of the engaging hole 129 formed in the first concave wall 121 in the upward, rearward direction (see FIG. 17). The second wall 122B is connected to the rear end portion of the second wall 122A. The second wall 122B is formed as a wall that projects from the base wall 81K in the first direction D1. The distal end of the second wall 122B in the direction D3 inclines rearward and downward and thus partially surrounds the second opening 81B in the direction D2.

As shown in FIGS. 15 and 17, the engaged part 65 of the casing cap 63, more particularly, the insertion part 66 and the first and second engaging claws 67A and 67B, of the first transmission cable 60 (60A) is inserted into the engaging hole 119. The contact part 64 of the casing cap 63 comes into contact with the first concave wall 111 by being moved upward in the second direction D2. After the insertion part 66 passes through the engaging hole 119, the distal end portions (having the recessed step shape) of the first and second engaging claws 67A and 67B engage, with an elastic restoration force, the opposite short sides of the engaging hole 119 and thereby prevent the insertion part 66 from being removed from (pulled out of) the engaging hole 119. In this way, the engaged part 65 engages with the engaging hole 119 in the second direction D2 when the contact part 64 is moved into contact with the first concave wall 111. The contact part 64 of the casing cap 63 is sandwiched by the base wall 81K and the holding wall 113 in the first direction D1 when the contact part 64 contacts the first concave wall 111 in the second direction D2. Furthermore, the fitting concave part 114D of the positioning wall 114 fits (engages) in the annular groove 63M of the casing cap 63, whereby the first positioning segment 115 comes into contact with the second positioning segment 68 in the third direction D3.

Similarly, the engaged part 65 of the casing cap 63, more particularly, the insertion part 66 and the first and second engaging claws 67A and 67B, of the second transmission cable 60 (60B) is inserted into the engaging hole 129. The contact part 64 of the casing cap 63 comes into contact with the first concave wall 121 by being moved upward in the second direction D2. After the insertion part 66 passes through the engaging hole 129, the distal end portions (having the recessed step shape) of the first and second engaging claws 67A and 67B engage, with an elastic restoration force, the opposite short sides of the engaging hole 129 and thereby prevent the insertion part 66 from being removed from (pulled out of) the engaging hole 129. In this way, the engaged part 65 engages with the engaging hole 129 in the second direction D2 when the contact part 64 is moved into contact with the first concave wall 121. The contact part 64 of the casing cap 63 is sandwiched by the base wall 81K and the holding wall 123 in the first direction D1 when the contact part 64 contacts the first concave wall 121 in the second direction D2. Furthermore, the fitting concave part 124D of the positioning wall 124 fits (engages) in the annular groove 63M of the casing cap 63, whereby the first positioning segment 125 comes into contact with the second positioning segment 68 in the third direction D3.

As a result, as shown in FIG. 2, the casing caps 63 of the first and second transmission cables 60 (60A, 60B) are reliably fixed to the second housing 80.

Operation and Effects

In the door lock apparatus 1 of above-described Embodiment 1, the first end of the outer cable 61 of the first transmission cable 60 (60A) is fixed to the first concave wall 111 by the interaction of the engaging hole 119 formed in the first concave wall 111 of the second housing 80 and the contact part 64 and the engaged part 65 formed on the casing cap 63 of the first transmission cable 60 (60A) as shown in FIGS. 2, 15, and 17. Similarly, the first end of the outer cable 61 of the second transmission cable 60 (60B) is fixed to the first concave wall 121 by the interaction of the engaging hole 129 formed in the first concave wall 121 of the second housing 80 and the contact part 64 and the engaged part 65 formed on the casing cap 63 of the second transmission cable 60 (60B).

Consequently, because the auxiliary cover disclosed in the above-described JP 2012-180702 is not necessary, the part count can be reduced. In addition or in the alternative, it is possible to realize a reduction in thickness in the vehicle inward-outward direction because the thickness of the auxiliary cover is eliminated. In this regard, it is noted that the contact parts 64 of the casing caps 63 of the first and second transmission cables 60A, 60B come into contact with the first concave walls 111 and 121, respectively, in the second direction D2, which is at least substantially orthogonal to the vehicle inward-outward direction. Similarly, the engaged parts 65 of the casing caps 63 of the first and second transmission cables 60A, 60B engage with the engaging holes 119 and 129 of the first concave walls 111 and 121, respectively, in the second direction D2 as well. Therefore, unlike conventional designs, the contact part 64 and the engaged part 65 are not design constraints that prevent a reduction in thickness in the vehicle inward-outward direction.

In addition to the above-described advantageous effects, in the above-described door lock apparatus 1, even if an impact (shock or impulse) acts on the door in the vehicle inward-outward direction (e.g., due to a vehicle side collision), the engaged parts 65 of the casing caps 63, which respectively engage with the engaging holes 119 and 129 of the first concave walls 111 and 121 in the second direction D2 (i.e. at least substantially orthogonal to the vehicle inward-outward direction), are less likely to be pulled out (removed) from the engaging holes 119 and 129. Therefore, the first ends of the outer cables 61 are fixed to the first concave walls 111 and 121 in a more durable manner, e.g., in the event of a vehicle side collision.

In the door lock apparatus 1 of the above-described Embodiment 1, the engaging parts are the engaging holes 119 and 129 that pass (penetrate) through the first concave walls 111 and 121, respectively, as shown in FIGS. 15 and 17. Each engaged part 65 includes the insertion part 66 and the first and second engaging claws 67A and 67B. Consequently, during assembly of the door lock apparatus 1, when the first transmission cable 60 (60A) is coupled (linked) to the inside open lever 25 and the second transmission cable 60 (60B) is coupled (linked) to the inside lock lever 35, the insertion parts 66 are first inserted into the engaging holes 119 and 129, respectively, and the first and second engaging claws 67A and 67B of the engaged parts 65 then respectively engage in the engaging holes 119 and 129. To perform maintenance on the vehicle door lock apparatus 1, an elongated tool or the like can be easily inserted through the opening in the second walls 112A and 122A in the direction D1 to elastically deform (squeeze together) the first and second engaging claws 67A and 67B and thereby release the engagement of the first and second engaging claws 67A and 67B from the engaging holes 119 and 129. On the other hand, when the door lock apparatus 1 is attached to the interior of the vehicle door in its normal operating state, the first and second engaging claws 67A and 67B are covered by a door panel, thereby blocking entry into the interior of the door lock apparatus 1. Therefore, the engagement of the first and second engaging claws 67A and 67B in the engaging holes 119 and 129 is unlikely to be released. Even if the first and second transmission cable 60 (60A, 60B) is strongly pulled, disengagement (pulling out) of the first and second engaging claws 67A and 67B from the engaging holes 119 and 129 is unlikely, thereby providing improved anti-theft protection.

Furthermore, the engaging holes 119 and 129 of the above-described door lock apparatus 1 are each formed in (as) a slit shape as shown, e.g., in FIGS. 7 and 15, such that the short sides of the slit shape extend in the first direction D1 and the long sides of the slit shape extend in the third direction D3. The first and second engaging claws 67A and 67B are provided at (on) opposite ends of the insertion part 66 in the third direction D3. Consequently, by designing the engaging holes 119 and 129, the insertion part 66, and the first and second engaging claws 67A and 67B in this manner, the door lock apparatus 1 can be designed less bulky (wide) in the vehicle inward-outward direction, such that a reduction in thickness in the vehicle inward-outward direction can be realized.

In the door lock apparatus 1 according to the above-described Embodiment 1, the second walls 112A, 112B, and 112C formed in (on) the second housing 80 surround the first concave wall 111 and the first opening 81A in the upward direction; similarly, the second walls 122A and 122B surround the first concave wall 121 and the second opening 81B in the upward direction. Consequently, it is possible to prevent water, foreign matter, or the like that might enter the housing chamber 7A through the first and second openings 81A and 81B from reaching and adhering to the inner cables 62, etc. that are exposed at the first end of the outer cables 61. As a result, it is not necessary to provide a separate water-proof cover for blocking water, foreign matter, etc.

Furthermore, if a thin tool (e.g., a so-called "slim jim" or other kind of lock-picking tool) is inserted into the interior of the door from above (e.g., between the door window and the rubber seal), the tool will be blocked by the second walls 112A, 112B, 112C, 122A, and 122B. Consequently, because it is difficult to forcibly pull the inner cable(s) 62 of the first and/or second transmission cable(s) 60 (60A, 60B) to release the engagement of the first and second engaging claws 67A and 67B from the engaging holes 119 and 129, the above-described embodiment provides improved anti-theft protection.

Further, in the above-described door lock apparatus 1, the casing cap 63 of each of the first and second transmission cable 60 (60A, 60B) is sandwiched by (between) the base wall 81K and the holding walls 113 and 123, respectively, with the contact parts 64 respectively in contact with the concave walls 111 and 121 as shown in FIG. 2. Therefore, the first concave walls 111 and 121 reliably fix the contact parts 64. Consequently, even if an impact (shock or impulse) acts on (is applied to) the door in the vehicle inward-outward direction (e.g., due to a vehicle side collision), because the casing caps 63 are sandwiched by (between) the base wall 81K and the holding walls 113 and 123, respectively, of the second housing 80, they are less likely to come off the first concave walls 111 and 121 in the event of a vehicle side impact.

In the door lock apparatus 1 according to the above-described Embodiment 1, the annular groove 63M of the casing cap 63 of each of the first and second transmission cable 60 (60A, 60B) surrounds the fitting concave parts 114D and 124D, respectively, of the positioning walls 114 and 124 as shown in FIG. 17, whereby the first positioning segments 115 and 125 contact the respective second positioning segments 68 in the third direction D3. Consequently, this aspect of the design of the above-described door lock apparatus 1 restricts or limits positional deviations (displacements) in the third direction D3 of the casing cap 63. That is, the casing caps 63 are respectively fixed to the first concave walls 111 and 121 without play (backlash). As a result, it is possible to reliably and precisely transmit displacement (relative sliding movement) of the inner cable 62 of the first transmission cable 60 (60A) to the inside open lever 25, as well as of the inner cable 62 of the second transmission cable 60 (60B) to the inside lock lever 35.

Furthermore, when the first transmission cable 60 (60A) will be coupled (linked) to the inside open lever 25 during assembly, the jig (tool) J1 is inserted through the jig insertion hole 83H and into the housing chamber 7A as shown in FIG. 16 in order to push the one end 25A of the inside open lever 25, thereby rotating the inside open lever 25 to its operating position and exposing the linkage 25J to the outside through the first opening 81A. Consequently, it is possible to easily couple (link) the first end of the inner cable 62 of the first transmission cable 60 (60A) to the linkage 25J of the inside open lever 25 through the first opening 81A. After the inner cable 62 has been coupled to the inside open lever 25, the jig J1 is removed from the jig insertion hole 83H, whereby the inside open lever 25 returns to its initial position shown in FIGS. 4 and 10 owing to the urging force of the torsion coil spring 20T shown in FIG. 5. Therefore, the linkage 25J moves farther away from the first opening 81A and is no longer exposed to the outside. Due to this movement away from the first opening 81A, it becomes more difficult for a lock-picking tool to reach the linkage 25J, thereby providing improved anti-theft protection, even if no separate cover for covering first the opening 81A is provided.

Furthermore, when the second transmission cable 60 (60B) is being coupled to the inside lock lever 35 during assembly, the linearly moving lock lever 40 is in the unlocked position as shown by the solid line of the FIG. 16 such that the linkage 35J of the inside lock lever 35 is exposed to the outside through the second opening 81B. Consequently, it is possible to easily couple (link) the first end of the inner cable 62 of the second transmission cable 60 (60B) to the linkage 35J of the inside lock lever 35 through the second opening 81B. On the other hand, in the locked state, the linkage 35J of the inside lock lever 35 is spaced farther away from the second opening 81B and is not exposed to the outside. Due to this movement away from the second opening 81B, it becomes more difficult for a lock-picking tool to reach the linkage 35J, thereby providing improved anti-theft protection, even if no separate cover for covering the second opening 81B is provided Embodiment 2

Figure 18:
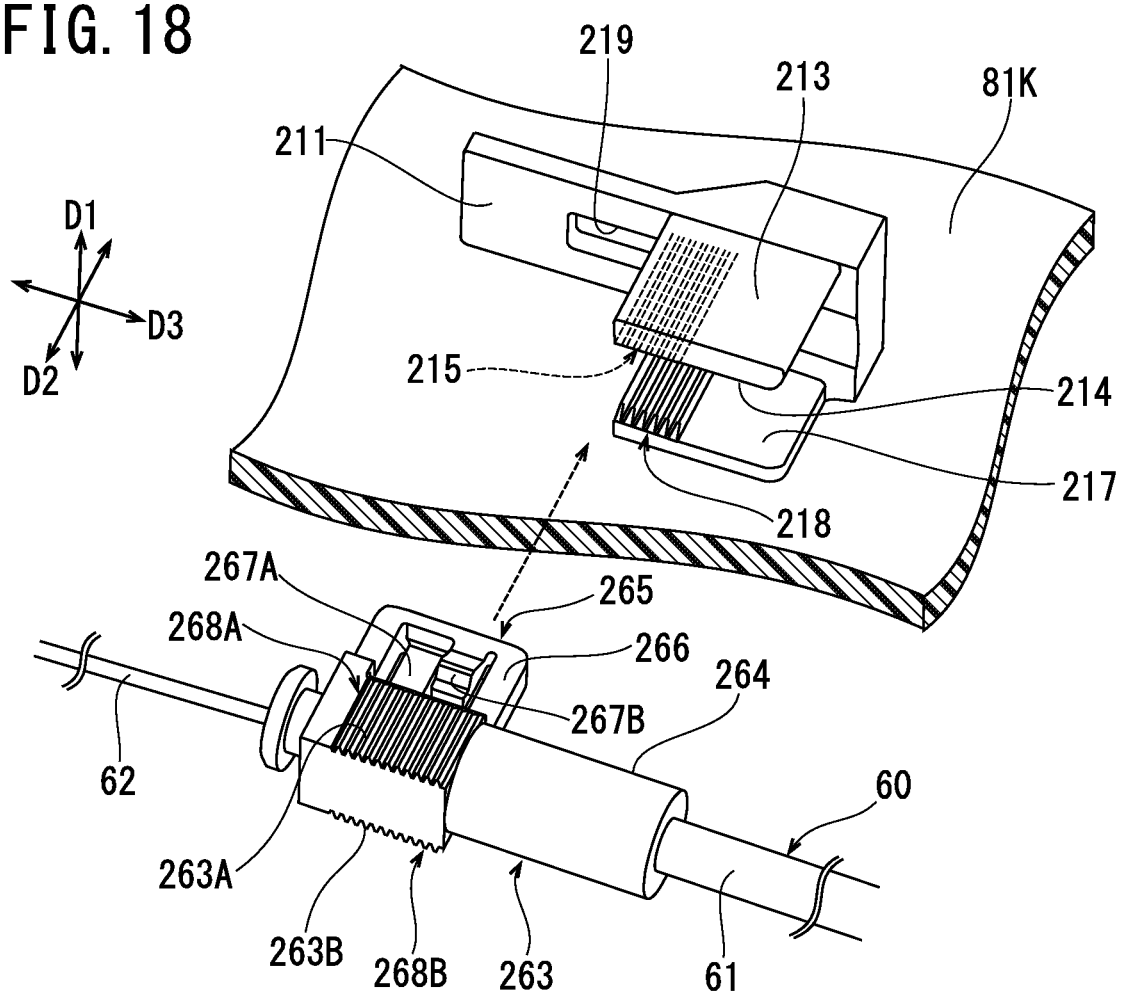
FIG. 18 is a partial perspective view relating to the vehicle lock apparatus of Embodiment 2 and that shows a first wall, an engaging part, a holding wall, and a third positioning segment, which are all formed in (on) a second housing, as well as a contact part, an engaged part, and a fourth positioning segment, which are all formed in (on) a casing cap of a transmission cable.
Figure 19:
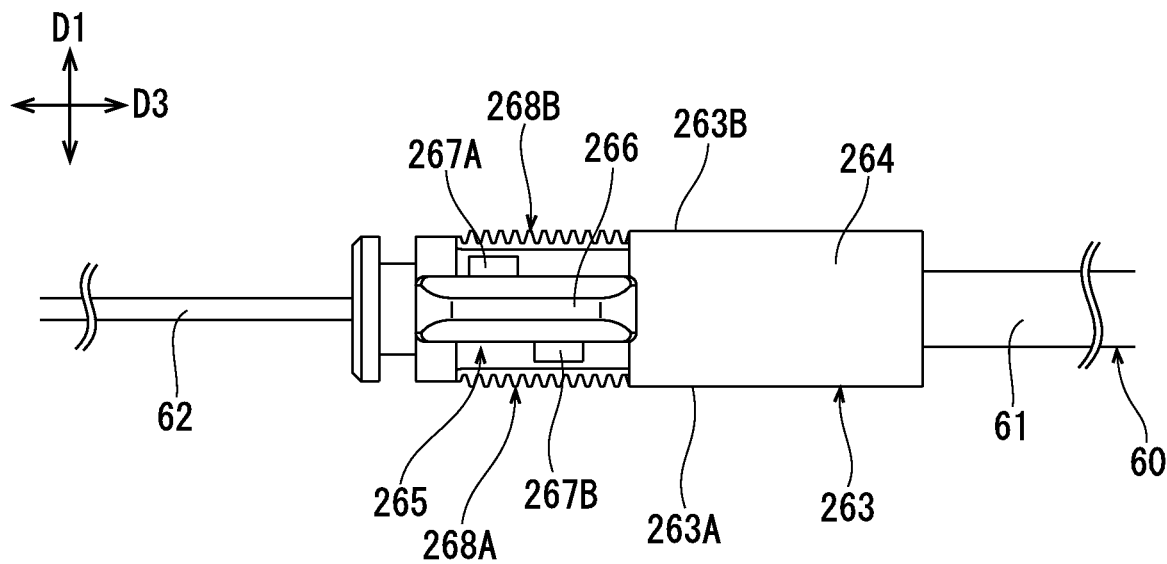
FIG. 19 is a partial front view relating to the vehicle lock apparatus of Embodiment 2 and that shows the casing cap of the transmission cable.

In the door lock apparatus of Embodiment 2, a casing cap 263, as shown in FIGS. 18 and 19, is utilized instead of the casing cap 63 according to Embodiment 1. In the door lock apparatus of Embodiment 2, a first wall 211 shown in FIG. 18 is formed in (on) the second housing 80 instead of the first concave walls 111 and 121 according to Embodiment 1. The other components in Embodiment 2 are basically the same as the components in Embodiment 1. For this reason, components of Embodiment 2 that are the same as components in Embodiment 1 are denoted by the same reference numerals or symbols and an explanation of such components is omitted or simplified.

As shown in FIGS. 18 and 19, the casing cap 263 of the transmission cable 60 has a contact part 264 and an engaged part 265. The contact part 264 is a cylindrical outer circumferential surface of the casing cap 263. The engaged part 265 includes an insertion part 266 and first and second engaging claws 267A and 267B.

The insertion part 266 projects radially outward from the contact part 264 of the casing cap 263 at a distal end portion where a portion of the inner cable 62 is exposed from the casing cap 263. The first and second engaging claws 267A and 267B are integrally formed in the center of the insertion part 266.

When the casing cap 263 is fixed to the second housing 80, the axial direction of the casing cap 263 becomes parallel to the third direction D3, the contact part 264 extends in the third direction D3, and the insertion part 266 projects in the second direction D2. The first and second engaging claws 267A and 267B project in opposite directions in the first direction D1 such that the first and second engaging claws 267A and 267B are spaced apart from each other in the first direction D1. The first and second engaging claws 267A and 267B are elastically deformable so as to approach (become closer to) each other.

As shown in FIG. 18, the first wall 211 is formed as a wall that projects from the base wall 81K in the first direction D1 and extends along the third direction D3. Although the first wall 211 is primarily flat, it may include a curved or concave groove that matches (receives or seats) the outer cylindrical surface of the contact part 264, as shown in FIG. 18.

The engaging hole 219 passes through the first wall 211 in the second direction D2 and is parallel to the third direction D3. The engaging hole 219 is formed in a slit (rectangular) shape, such that the short sides extend in the first direction D1 and the long sides extend in the third direction D3. The engaging hole 219 is another representative, non-limiting example of an "engaging part" according to the present teachings. The length of the long sides of the engaging hole 219 is set sufficiently larger than the length of the insertion part 266 in the third direction D3. Consequently, it is possible to shift (displace) the insertion part 266 in the third direction D3 when the insertion part 266 has been inserted into the engaging hole 219.

The holding wall 213 projects from the distal end of the first wall 211 in the second direction D2 and extends along the third direction D3. The holding wall 213 is formed as a wall that is parallel to the base wall 81K, and is located at a position that is offset from the engaging hole 219 in the third direction D3.

A third positioning segment 215 is formed on a first wall surface 214 of the holding wall 213 that contacts the casing cap 263. Another third positioning segment 218 is formed on a second wall surface 217 of the base wall 81K that also contacts the casing cap 263. The two third positioning segments 215 and 218 each have a plurality of teeth that extend in parallel to one another in the second direction D2 and have a fixed pitch.

As shown in FIGS. 18 and 19, a fourth positioning segment 268A is formed on a side surface 263A of the casing cap 263 that contacts the first wall surface 214. Another fourth positioning segment 268B is formed on the opposite side surface 263B of the casing cap 263 that contacts the second wall surface 217. The two fourth positioning segments 268A and 268B each have a plurality of teeth that extend in parallel to one another in the second direction D2 and have the same pitch as the teeth of the third positioning segments 215 and 218.

During assembly, the engaged part 265 (i.e. the insertion part 266 and the first and second engaging claws 267A and 267B) of the casing cap 263 of the transmission cable 60 is inserted into the engaging hole 219. At this time, it is possible to adjust the positional relationship of the casing cap 263 relative to the first wall 211 by appropriately shifting, in the third direction D3, the meshing positions of the teeth formed on the third positioning segments 215 and 218 relative to the teeth formed on the fourth positioning segments 268A and 268B. The contact part 264 of the casing cap 263 comes into contact with (the concave groove of) the first wall 211 by pushing it in the second direction D2. After the insertion part 266 passes through the engaging hole 219, the distal end portions (having the recessed, step shape) of the first and second engaging claws 267A and 267B respectively engage with the opposite long sides of the engaging hole 219 with an elastic restoration force and thereby prevent the insertion part 266 from coming off (being pulled out of) the engaging hole 219. In this way, the engaged part 265 engages with the engaging hole 219 in the second direction D2 with the contact part 264 in contact with the first wall 211. The contact part 264 of the casing cap 263 is sandwiched by (between) the base wall 81K and the holding wall 213 in the first direction D1 when the contact part 264 contacts the first wall 211 in the second direction D2.

In the above-described door lock apparatus of Embodiment 2, it is possible to realize a reduction in the part count and a reduction in thickness in the vehicle inward-outward direction similar to the door lock apparatus 1 of Embodiment 1. Furthermore, even if an impact (shock or impulse)

acts on (is applied to) the door in the vehicle inward-outward direction, the engaged part 265 of the casing cap 263, which engages in the engaging hole 219 of the first wall 211 in the second direction D2 that is substantially orthogonal to the vehicle inward-outward direction, is unlikely to come off, thereby ensuring a reliable securing (attachment) of the first end of the outer cable 61 to the first wall 211.

In the door lock apparatus of Embodiment 2, however, the meshing positions of the teeth formed on the third positioning segments 215 and 218 relative to the teeth formed on the fourth positioning segments 268A and 268B can be changed by appropriately shifting (displacing) the transmission cable 60 in the third direction D3. Therefore, it is possible to adjust the position where the casing cap 263 is fixed to the first wall 211 in order to thereby easily adjust the amount of the inner cable 62 that is exposed from the outer cable 61 at the end portion of the transmission cable 60 connected to the interior door lock knob H3 or to the interior door handle H4. Because the third positioning segments 215 and 218 mesh with the fourth positioning segments 268A and 268B, positional deviations of the casing cap 263 in the third direction D3 are restricted or limited. Furthermore, because the casing cap 263 is fixed to the first wall 211 without play (backlash), it is possible to reliably and precisely transmit displacement of the inner cable 62 of the transmission cable 60 to the inside open lever 25 or the inside lock lever 35, which are representative, non-limiting examples of a "rotatable element" according to the present teachings.

Although the present teachings have been described above in line with Embodiments 1 and 2, it is needless to say that the invention is not limited to the above Embodiments 1 and 2, and may be appropriately modified in application without departing from the gist of the invention.

For example, the engaging part of the first concave wall or the first wall may instead include the insertion part and the engaging claws. In this case, the engaged part of the casing cap may include the engaging hole.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vehicle door lock apparatuses and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A vehicle door lock apparatus that is fixedly disposed between a vehicle frame and a door that is openable and closable with respect to the vehicle frame, and is capable of holding the door closed with respect to the vehicle frame, the vehicle door lock apparatus comprising:
  a housing having an inner housing chamber formed inside the housing;
  a latch mechanism housed in the housing and configured to hold the door closed with respect to the vehicle frame;
  an actuating mechanism housed in the inner housing chamber and including a rotatable element that rotates around a rotational axis extending in a first direction, the rotatable element being configured to actuate the latch mechanism; and
  a transmission cable extending through a wall of the housing into the inner housing chamber and configured to rotate the rotatable element;
wherein:
  the first direction is at least substantially parallel to a vehicle inward-outward direction,
  a second direction is at least substantially orthogonal to the first direction,
  a third direction is at least substantially orthogonal to the first direction and the second direction,
  the housing includes a first housing superimposed on a second housing in the first direction to form the inner housing chamber,
  the second housing has:
    a base wall extending in the second direction and the third direction,
    a first wall that projects from the base wall in the first direction and also extends along the third direction,
    an engaging hole defined by a closed surface on the first wall, the engaging hole being contained in a plane extending in the first and third directions, and
    an opening that passes through the base wall and provides a path from an exterior into the inner housing chamber,
  the transmission cable includes an inner cable slidably disposed within an outer cable,
  a portion of the inner cable is an exposed portion exposed at a first end portion of the outer cable,
  the exposed portion extends through the opening and is coupled to the rotatable element via a linkage,
  a casing cap is disposed around the first end portion of the outer cable and assembled to the first wall, and
  the casing cap has an engaged part extending through the engaging hole of the first wall and including at least one first portion engaging with a surface of the first wall that extends in the first and third directions to retain the engaged part in engagement with the engaging hole, and at least one second portion that is entirely surrounded by the closed surface defining the engaging hole.

2. The vehicle door lock apparatus according to claim 1, wherein:
  the at least one second portion of the engaged part includes an insertion part inserted into the engaging hole and the at least one first portion of the engaged part includes engaging claws formed integrally with the insertion part, and the engaging claws exert an elastic restoration force that prevents the insertion part from being pulled out of the engaging hole after the insertion part has passed through the engaging hole.

3. The vehicle door lock apparatus according to claim 2, wherein:
the engaging hole is formed in a slit shape having short sides that extend in the first direction and long sides that extend in the third direction, and
the engaging claws are provided at opposite ends of the insertion part in the third direction.

4. The vehicle door lock apparatus according to claim 1, wherein the second housing has a second wall projecting from the base wall in the first direction and formed as a wall that at least partially surrounds the first wall such that the opening is located between the first wall and the second wall.

5. The vehicle door lock apparatus according to claim 1, wherein:
the second housing has a holding wall formed as a wall that projects from a distal end of the first wall and extends in parallel to the base wall, and
the casing cap is sandwiched between the base wall and the holding wall and a contact part of the casing cap is in contact with the first wall.

6. The vehicle door lock apparatus according to claim 1, wherein:
the second housing has a first positioning segment that is located near the first wall and faces the engaging hole in the third direction, and
the casing cap has a second positioning segment formed as a surface facing the third direction and in contact with the first positioning segment and a contact part of the casing cap is in contact with the first wall.

7. The vehicle door lock apparatus according to claim 5, further comprising:
third positioning segments respectively formed on a first wall surface of the holding wall that contacts the casing cap and on a second wall surface of the base wall that contacts the casing cap, each of the third positioning segments having a plurality of teeth extending in parallel to one another in the second direction and having a fixed pitch, and
fourth positioning segments respectively formed on side surfaces of the casing cap that contact the first wall surface and the second wall surface, each of the fourth positioning segments having a plurality of teeth extending in parallel to one another in the second direction and having the same fixed pitch as the teeth of the third positioning segments,
wherein the fourth positioning segments are configured to mesh with the third positioning segments while permitting the fourth positioning segments to be shifted in an axial direction of the casing cap within a predetermined range.

8. The vehicle door lock apparatus according to claim 1, wherein the rotatable element is configured to rotate such that:
the linkage is exposed through the opening to an outside of the inner housing chamber during assembly or in an unlocked state in which actuation of the actuating mechanism of the latch mechanism is enabled, and
the linkage is spaced apart from the opening and thus not exposed to the outside after the assembly is completed or in a locked state in which the actuation of the actuating mechanism of the latch mechanism is disabled.

9. The vehicle door lock apparatus according to claim 3, wherein the second housing has a second wall projecting from the base wall in the first direction and formed as a wall that at least partially surrounds the first wall such that the opening is located between the first wall and the second wall.

10. The vehicle door lock apparatus according to claim 9, wherein:
the second housing has a holding wall formed as a wall that projects from a distal end of the first wall and extends in parallel to the base wall, and
the casing cap is sandwiched between the base wall and the holding wall and a contact part of the casing cap is in contact with the first wall.

11. The vehicle door lock apparatus according to claim 10, wherein:
the second housing has a first positioning segment that is located near the first wall and faces the engaging hole in the third direction, and
the casing cap has a second positioning segment formed as a surface facing the third direction and in contact with the first positioning segment =Mien and the contact part is in contact with the first wall.

12. The vehicle door lock apparatus according to claim 11, wherein the rotatable element is configured to rotate such that:
the linkage is exposed through the opening to an outside of the inner housing chamber during assembly or in an unlocked state in which actuation of the actuating mechanism of the latch mechanism is enabled, and
the linkage is spaced apart from the opening and thus not exposed to the outside after the assembly is completed or in a locked state in which the actuation of the actuating mechanism of the latch mechanism is disabled.

13. The vehicle door lock apparatus according to claim 10, further comprising:
third positioning segments respectively formed on a first wall surface of the holding wall that contacts the casing cap and on a second wall surface of the base wall that contacts the casing cap, each of the third positioning segments having a plurality of teeth extending in parallel to one another in the second direction and having a fixed pitch, and
fourth positioning segments respectively formed on side surfaces of the casing cap that contact the first wall surface and the second wall surface, each of the fourth positioning segments having a plurality of teeth extending in parallel to one another in the second direction and having the same fixed pitch as the teeth of the third positioning segments,
wherein the fourth positioning segments are configured to mesh with the third positioning segments while permitting the fourth positioning segments to be shifted in an axial direction of the casing cap within a predetermined range.

14. A vehicle comprising:
a vehicle frame;
a striker attached to the vehicle frame;
a vehicle door that is openable and closable with respect to the vehicle frame;
a housing affixed to the vehicle door and comprising a first housing superimposed on a second housing in a first direction such that an inner housing chamber is defined between the first housing and the second housing;

a latch mechanism disposed in the inner housing chamber and configured to hold and release the striker attached to the vehicle frame;
an actuating mechanism disposed in the inner housing chamber and including a lever that is rotatable around a rotational axis extending in the first direction to actuate the latch mechanism; and
a transmission cable having an outer cable, an inner cable slidably disposed within the outer cable, and a casing cap disposed around an end portion of the outer cable;
wherein:
the first direction is at least substantially parallel to a vehicle inward-outward direction,
a second direction is at least substantially orthogonal to the first direction,
a third direction is at least substantially orthogonal to the first direction and the second direction,
the second housing has:
  a base wall extending in the second direction and the third direction,
  a first wall that projects from the base wall in the first direction and also extends along the third direction,
  an engaging hole defined by a closed surface on the first wall, the engaging hole being contained in a plane extending in the first and third directions, and
  an opening that passes through the base wall,
an exposed portion of the inner cable adjacent to the casing cap extends through the opening and is operably coupled to the lever, and
the casing cap has an engaged part extending through the engaging hole of the first wall and including at least one first portion engaging with a surface of the first wall that extends in the first and third directions to retain the engaged part in engagement with the engaging hole, and at least one second portion that is entirely surrounded by the closed surface defining the engaging hole.

15. The vehicle according to claim 14, wherein:
the at least one second portion of the engaged part includes an insertion part inserted into the engaging hole and the at least one first portion of the engaged part includes engaging claws formed integrally with the insertion part,
the engaging claws engage with edges of the engaging hole while exerting an elastic restoration force that prevents the insertion part from being pulled out of the engaging hole after the insertion part has passed through the engaging hole; and
the engaging claws are aligned in the third direction.

16. The vehicle according to claim 15, wherein the lever is configured to rotate such that:
an end of the lever that is attached to the inner cable is exposed through the opening to an outside of the inner housing chamber during assembly or in an unlocked state in which actuation of the actuating mechanism of the latch mechanism is enabled, and
said end of the lever is spaced apart from the opening and thus not exposed to the outside after the assembly is completed or in a locked state in which the actuation of the actuating mechanism of the latch mechanism is disabled.

17. An apparatus comprising:
a housing comprising a first housing superimposed on a second housing in a first direction such that an inner housing chamber is defined between the first housing and the second housing;
a latch mechanism disposed in the inner housing chamber and configured to hold and release a striker attached to a vehicle frame;
an actuating mechanism disposed in the inner housing chamber and including a lever that is rotatable around a rotational axis extending in the first direction to actuate the latch mechanism; and
a transmission cable having an outer cable, an inner cable slidably disposed within the outer cable, and a casing cap disposed around an end portion of the outer cable;
wherein:
the first direction is at least substantially parallel to a vehicle inward-outward direction,
a second direction is at least substantially orthogonal to the first direction,
a third direction is at least substantially orthogonal to the first direction and the second direction,
the second housing has:
  a base wall extending in the second direction and the third direction,
  a first wall that projects from the base wall in the first direction and also extends along the third direction,
  an engaging hole defined by a closed surface on the first wall, the engaging hole being contained in a plane extending in the first and third directions, and
  an opening that passes through the base wall,
an exposed portion of the inner cable adjacent to the casing cap extends through the opening and is operably coupled to the lever, and
the casing cap has an engaged part extending through the engaging hole of the first wall and including at least one first portion engaging with a surface of the first wall that extends in the first and third directions to retain the engaged part in engagement with the engaging hole, and at least one second portion that is entirely surrounded by the closed surface defining the engaging hole.

18. The apparatus according to claim 17, wherein:
the at least one second portion of the engaged part includes an insertion part inserted into the engaging hole and the at least one first portion of the engaged part includes engaging claws formed integrally with the insertion part,
the engaging claws engage with edges of the engaging hole while exerting an elastic restoration force that prevents the insertion part from being pulled out of the engaging hole after the insertion part has passed through the engaging hole; and
the engaging claws are aligned in the third direction.

19. The apparatus according to claim 18, wherein the lever is configured to rotate such that:
an end of the lever that is attached to the inner cable is exposed through the opening to an outside of the inner housing chamber during assembly or in an unlocked state in which actuation of the actuating mechanism of the latch mechanism is enabled, and
said end of the lever is spaced apart from the opening and thus not exposed to the outside after the assembly is completed or in a locked state in which the actuation of the actuating mechanism of the latch mechanism is disabled.

20. The apparatus according to claim 19, wherein:
the engaging hole is formed in a slit shape having short sides that extend in the first direction and long sides that extend in the third direction,
the second housing has a second wall projecting from the base wall in the first direction and formed as a wall that at least partially surrounds the first wall such that the opening is located between the first wall and the second wall;

the second housing further has a holding wall formed as a wall that projects from a distal end of the first wall and extends in parallel to the base wall, and the casing cap is sandwiched between the base wall and the holding wall and a contact part of the casing cap is in contact with the first wall.

21. The vehicle door lock apparatus according to claim 1, wherein:

a contact part of the casing cap has an outer cylindrical surface extending in the third direction; and the first wall has a concave surface that matches the contact part.

22. The vehicle door lock apparatus according to claim 1, wherein the at least one portion of the engaged part includes first and second engaging claws that are spaced apart along the length of the transmission cable.

* * * * *